Nov. 11, 1969 A. M. REITER ET AL 3,478,166

CRYPTOGRAPHIC SUBSCRIPTION TELEVISION SYSTEM WITH GRAY SYNC AND DUAL MODE AUGMENTING SIGNALS

Filed Sept. 9, 1963 12 Sheets-Sheet 1

ABRAHAM M. REITER
PATRICK R. J. COURT
INVENTORS

BY Samuel Lindenberg

ATTORNEY

INVENTORS
ABRAHAM M. REITER
PATRICK R. J. COURT
BY Samuel Lindenberg
ATTORNEY

INVENTORS
ABRAHAM M. REITER
PATRICK R.J. COURT
BY Samuel Lindenberg
ATTORNEY

INVENTORS
ABRAHAM M. REITER
PATRICK R.J. COURT
BY Samuel Lindenberg
ATTORNEY

INVENTORS
ABRAHAM M. REITER
PATRICK R. J. COURT
BY Samuel Lindenberg
ATTORNEY

Nov. 11, 1969 A. M. REITER ET AL 3,478,166

CRYPTOGRAPHIC SUBSCRIPTION TELEVISION SYSTEM WITH GRAY SYNC AND DUAL MODE AUGMENTING SIGNALS

Filed Sept. 9, 1963 12 Sheets-Sheet 6

INVENTORS
ABRAHAM M. REITER
PATRICK R. J. COURT
BY Samuel Lindenberg
ATTORNEY

INVENTORS
ABRAHAM M. REITER
PATRICK R. J. COURT
BY Samuel Lindenberg
ATTORNEY

INVENTORS
ABRAHAM M. REITER
PATRICK R. J. COURT
BY Samuel Lindenberg
ATTORNEY

ABRAHAM M. REITER
PATRICK R.J. COURT
INVENTORS

BY Samuel Lindenberg

ATTORNEY

INVENTORS
ABRAHAM M. REITER
PATRICK R.J. COURT
BY Samuel Lindenberg
ATTORNEY

ABRAHAM M. REITER
PATRICK R.J. COURT
INVENTORS
BY Samuel Lindenberg
ATTORNEY

United States Patent Office 3,478,166
Patented Nov. 11, 1969

3,478,166

CRYPTOGRAPHIC SUBSCRIPTION TELEVISION SYSTEM WITH GREY SYNC AND DUAL MODE AUGMENTING SIGNALS

Abraham M. Reiter, Reseda, and Patrick R. J. Court, Los Angeles, Calif., assignors to International Telemeter Corporation, Los Angeles, Calif., a corporation of New York Filed Sept. 9, 1963, Ser. No. 307,639
Int. Cl. H04n 1/44
U.S. Cl. 178—5.1 37 Claims

ABSTRACT OF THE DISCLOSURE

A transmitter produces composite video signals with the sync component reduced in amplitude to grey level, also program audio and barker audio signals. Sync signal augmenting pulses are generated in two modes, one true and one false, which are randomly interchangeably transmitted over two transmission channels as determined by a control signal, which is transmitted to enable decoding. A receiving attachment enables an ordinary television receiver, by use of the control signal, to select the proper channel for true augmenting pulses which restore the grey sync pulses to their normal amplitude. Barker audio is provided to the receiver until the program is properly decoded.

This invention relates to broadcast subscription television systems and more particularly to improvements in cryptography used in such systems.

In broadcast subscription television systems a subscriber is asked to pay for the program. It is therefore most desirable to present such program to the subscriber in the best possible manner to maintain his goodwill. When such subscription television programs are transmitted over the air, it is necessary to provide cryptography so that only properly equipped subscriber receivers can receive and intelligibly present the program. Accordingly, in line with the requirement for the best possible presentation of the program to a subscriber, it is desirable to provide a method of unscrambling a program to which cryptography has been applied so that such program is least affected by any loss of weakness of the control signals sent from the transmitter which are necessary to such unscrambling. If the control signals are lost, due to signaling fading for example, the unscrambling should fail only as long as the control signals are missing. Immediately upon reappearance of the control signals, the unscrambling should re-establish itself correctly.

In order to improve the security of a cryptographic system, it is desirable that the scrambling and unscrambling function be capable of being performed with a multiplicity of codes. Each of these codes may then be assigned to a particular program transmission and may be recorded in an attachment for a subscriber, when a program is purchased, whereby the program purchased may be identified.

It is an object of this invention to provide a cryptographic system for a broadcast subscription television system in which the effects of interrupted control signals are minimized.

Another object of this invention is the provision of a novel and unique cryptographic system for a broadcast subscription television system.

Still another object of the present invention is the provision of a cryptographic system which provides a substantial multiplicity of codes whereby its security is insured.

These and other objects of this invention may be achieved in an arrangement wherein, at a transmitter, composite video signals are generated wherein all of the synchronizing signals, which may be designated as the composite sync signals, are reduced in amplitude to the grey level. Video signals with the composite sync signals in the grey level are hereafter referred to as "grey sync video." In addition to the above mentioned signals, the transmitter also generates two different audio signals, one of which is associated with the video signals and is known as program audio, and the other of which is used to inform a subscriber of the program so that he may decide whether or not to purchase same. These audio signals are known as barker audio signals. The transmitter also generates pulses, known as augment or augmenting pulses, which are employed at the receiver to restore the synchronizing signals to their proper level so that the composite video can then be properly and intelligibly displayed by the receiver. The transmitter generates both true augmenting signals and false augmenting signals which are transmitted over two channels. The true and false augmenting signals are interchanged between the two channels at substantially random times for assisting in the security of the program. In addition to the above, control signals are generated for indicating to a receiver which of the two channels has the correct augmenting signals.

All of the foregoing signals are transmitted. Each subscriber receiver is provided with an attachment which is inserted between the receiver antenna and the receiver antenna terminals. This attachment has provision for enabling the receiver to reproduce the barker audio signals until such time as the subscriber pays for viewing the television program. At this time the program audio is substituted for barker audio. The control signals indicate to the receiver attachment from which of the two channels the augment pulses should be selected. These are applied to a circuit which restores the composite synchronizing signals to their proper amplitudes whereby the receiver can intelligibly process the composite video and sync signals.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 21:
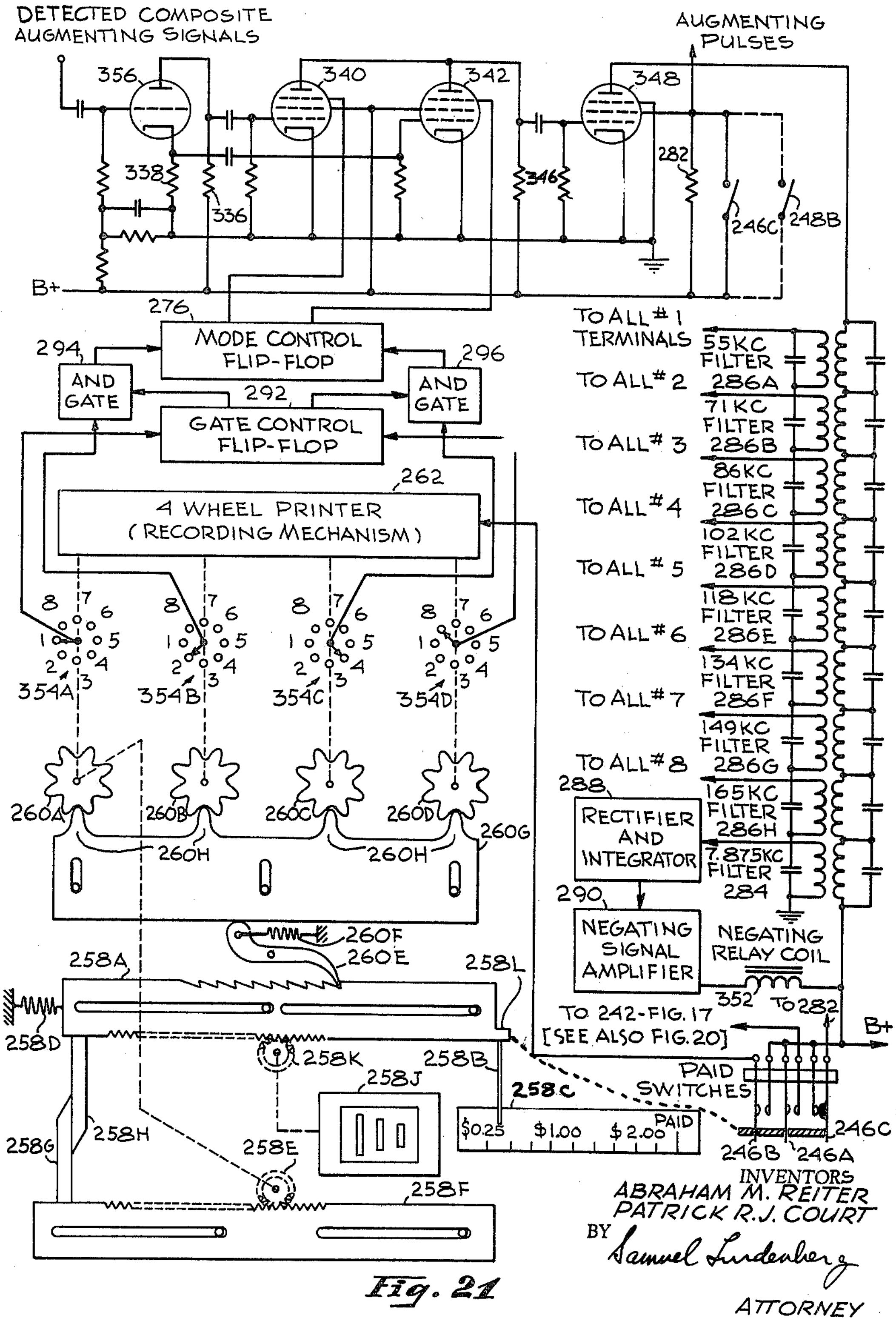

FIGURE 21 is a schematic diagram of the cryptographic decoder circuit 256, the subscriber selector switches 257, and price demand satisfaction apparatus 258.

Figure 22:
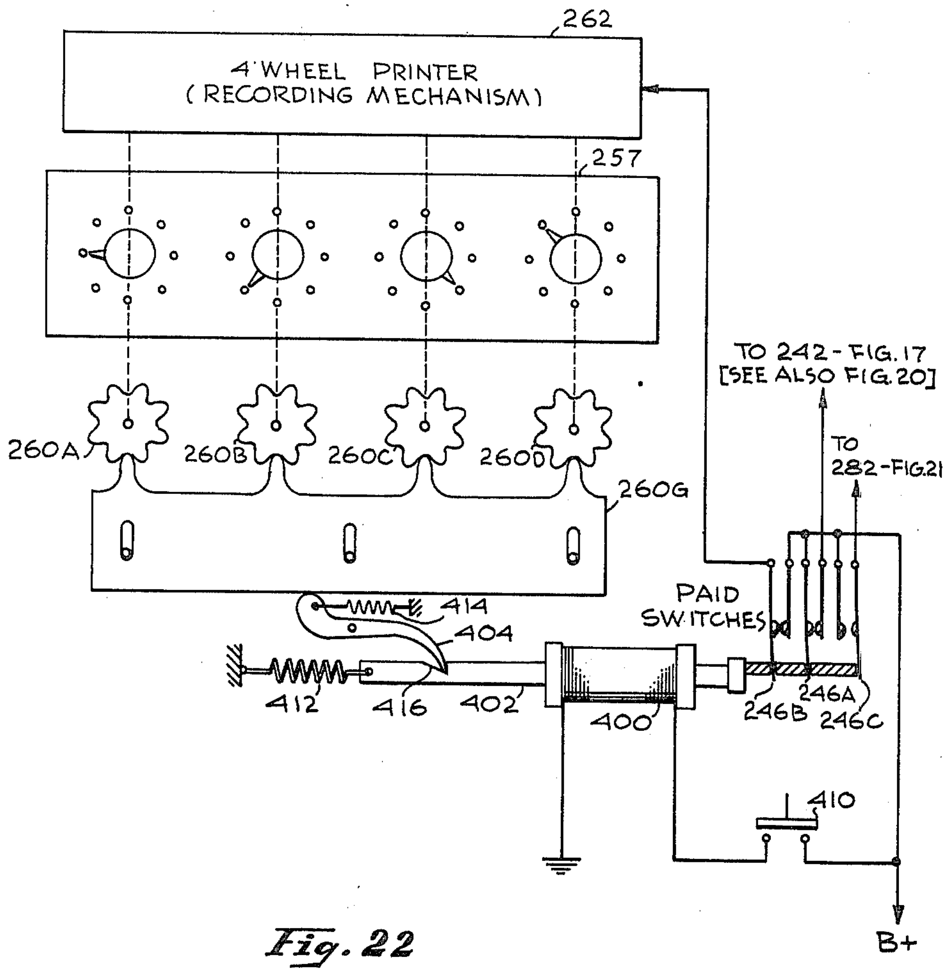

FIGURE 22 is a diagram of apparatus which may be used when a credit payment system is to be employed with this invention.

Figure 1:
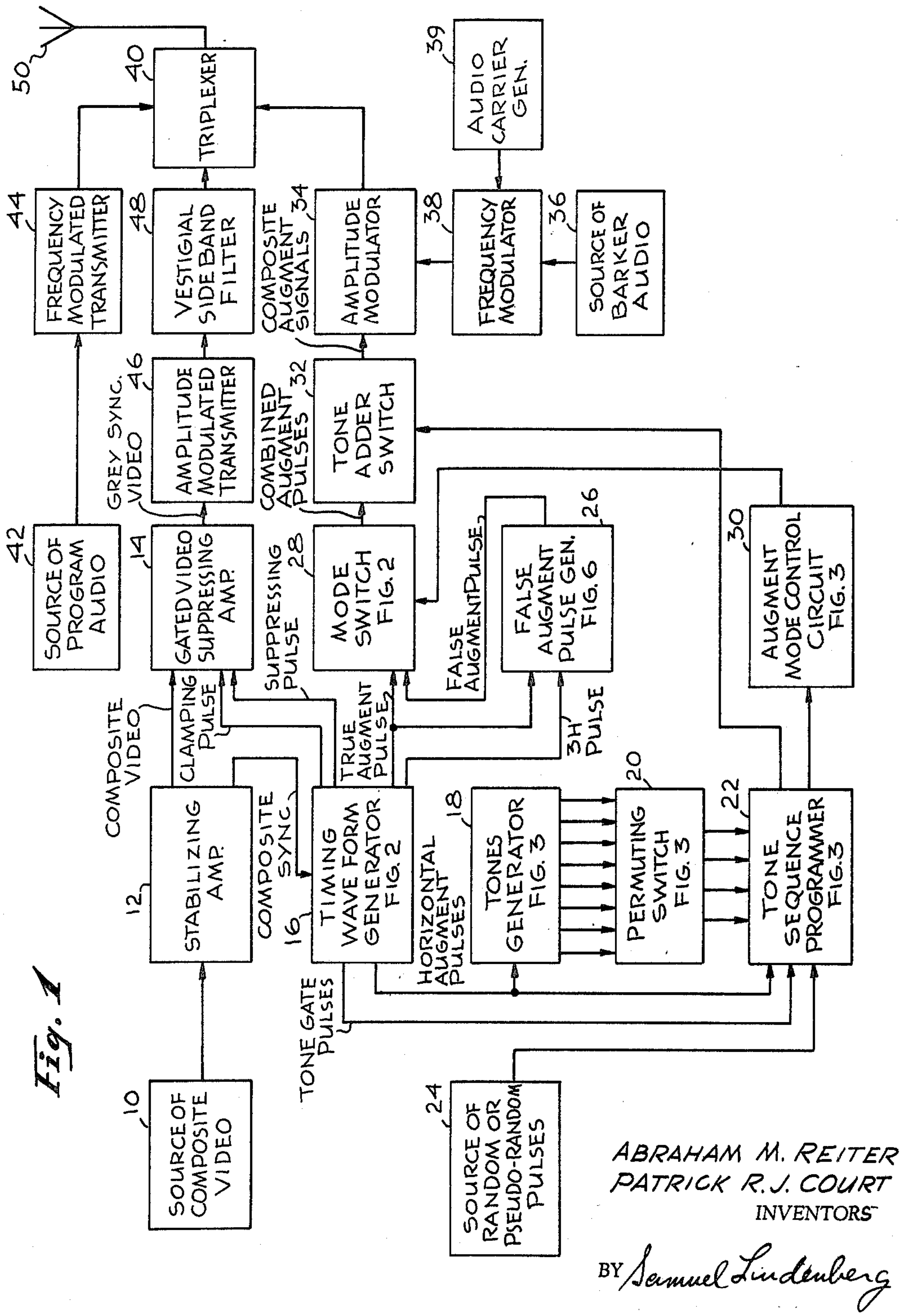
FIGURE 1 is a block diagram of a transmitter in accordance with this invention.
Figure 2:
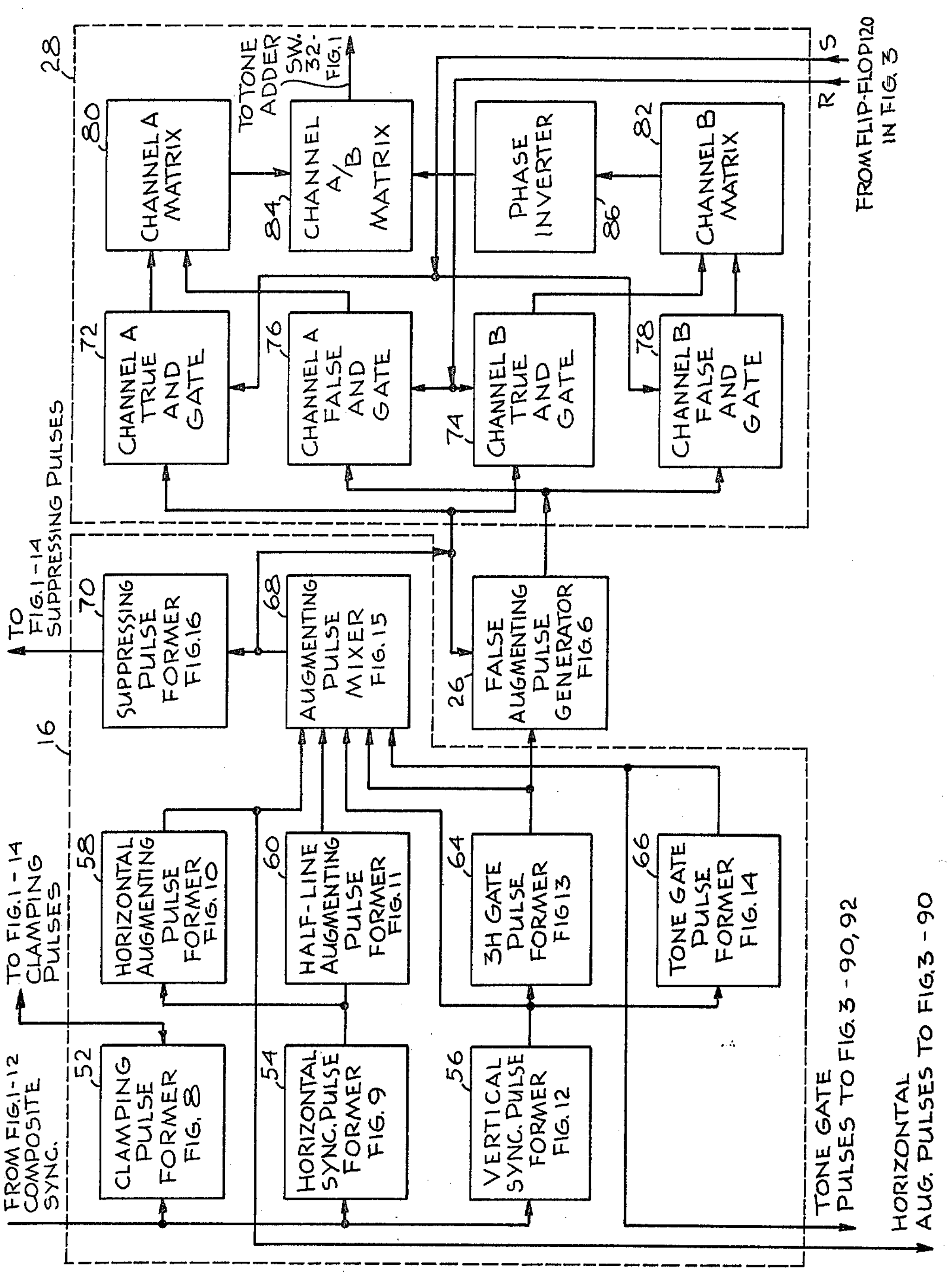
FIGURE 2 is a block diagram illustrating details of a timing waveform generator and a mode switch shown in FIGURE 1.

Reference is now made to FIGURE 1 which is a schematic block diagram of a transmitter in accordance with this invention. The transmitter has a source of composite video signals 10. The composite video signals are applied to a stabilizing amplifier 12. The stabilizing amplifier is a well known circiut arrangement in the television transmitting art. It functions to reshape and standardize the synchronizing signals in the composite video, to re-establish a correct blanking level, and to remove certain noise and other distortions from the composite video signal. The stabilizing amplifier provides two outputs. One of these is composite video signals which are applied to a gated video suppressing amplifier 14. The other is composite sync. This output of the stabilizing amplifier 12 is applied to a timing waveform generator 16. This timing waveform generator comprises a plurality of circuits which are shown in FIGURE 2.

Figure 4:
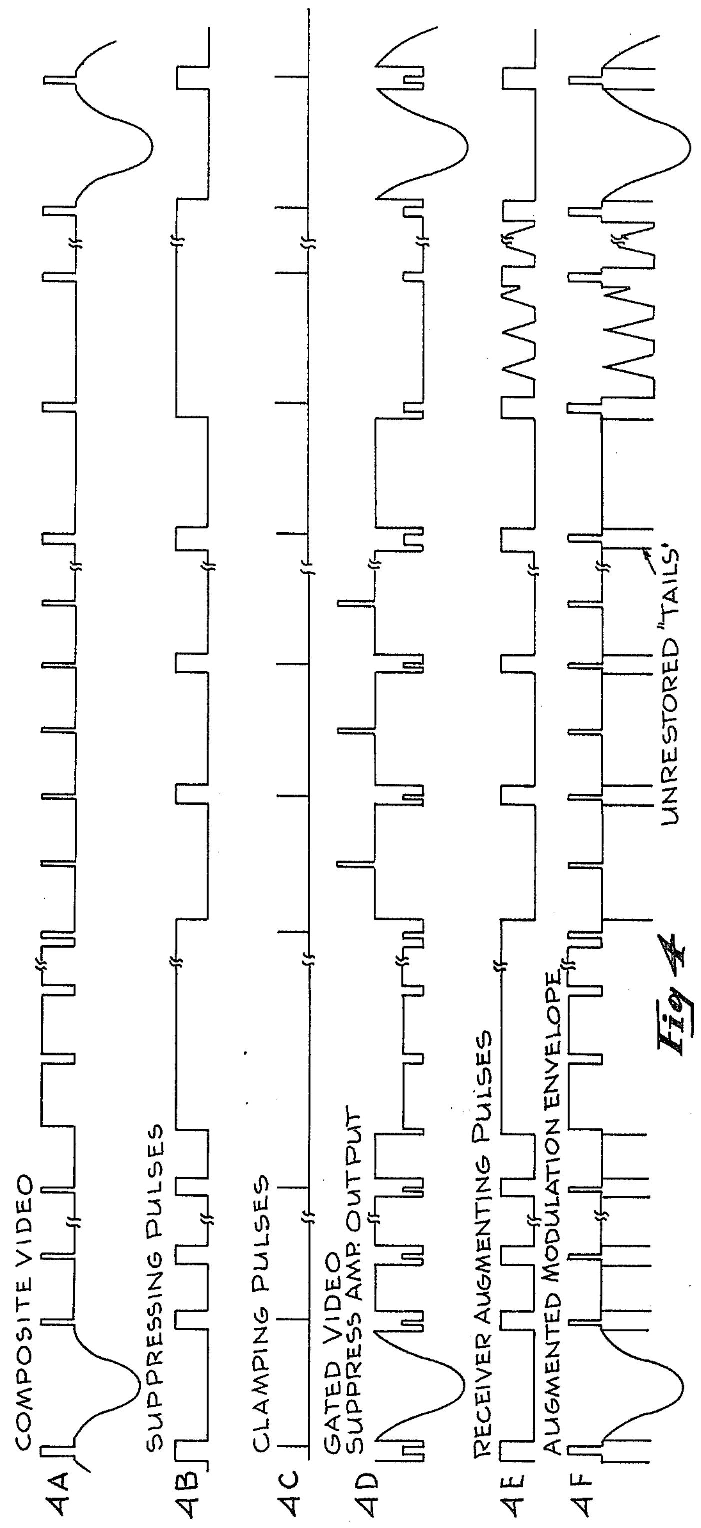
FIGURE 4 is a diagram illustrating some wave shapes which are generated at the transmitter.
Figure 7:
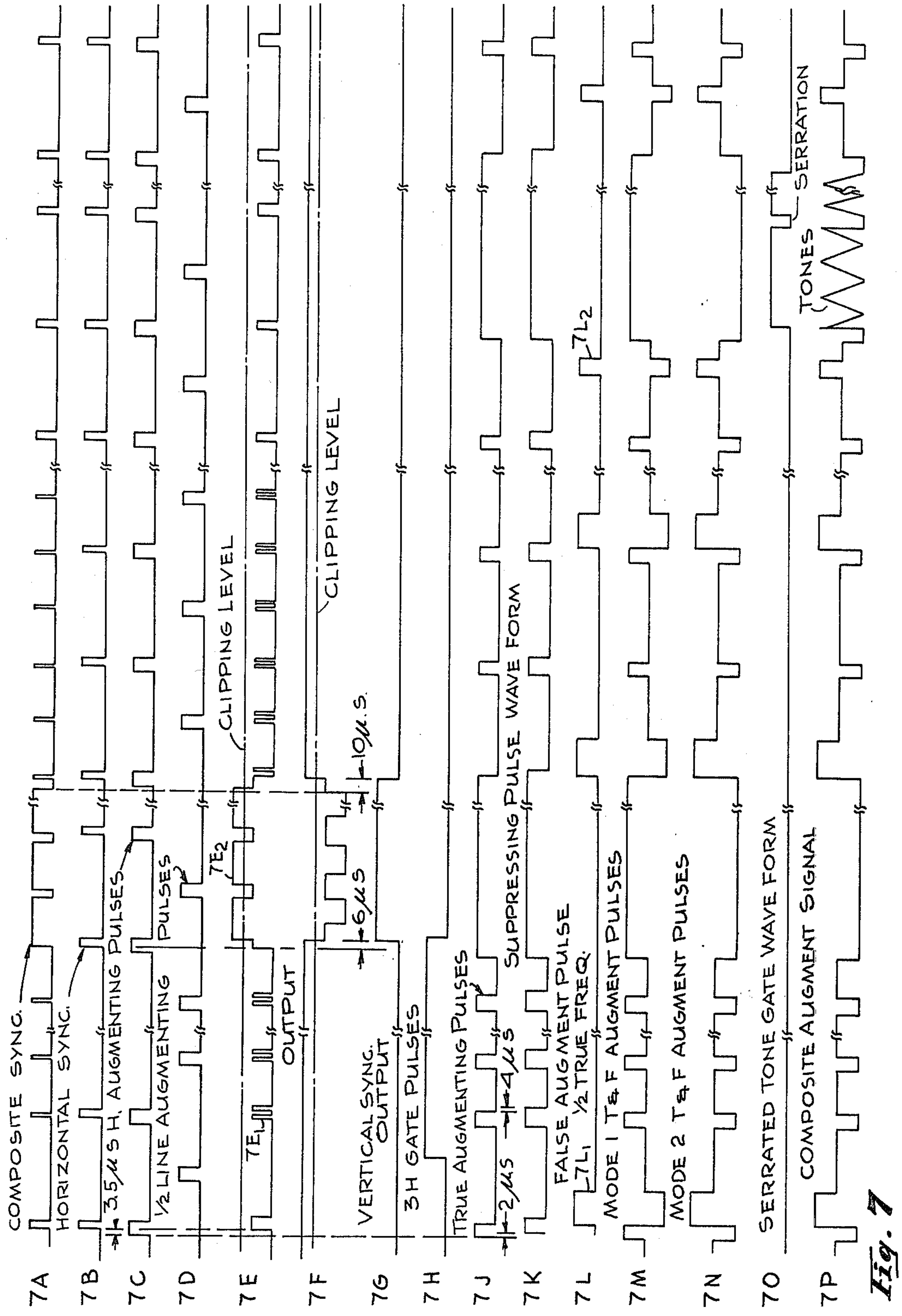
FIGURE 7 is a diagram illustrating some further wave shapes which are generated at the transmitter.

FIGURE 4 and FIGURE 7 illustrate some wave shapes which are generated at the transmitter. The wave shape 4A represents a portion of the composite video signals which are applied to the stabilizing amplifier commencing with the first line before vertical blanking and ending after vertical blanking.

The timing waveform generator 16 performs the function of providing certain timing pulses. Two of these are clamping pulses and suppressing pulses which are applied to the gated video suppressing amplifier 14 for the purpose of making grey sync video. The output of the gated video suppressing amplifier which is the grey sync video is the wave shape 4D shown in FIGURE 4. The suppressing pulses and clamping pulses respectively are wave shapes 4B and 4C in FIGURE 4.

Figure 3:
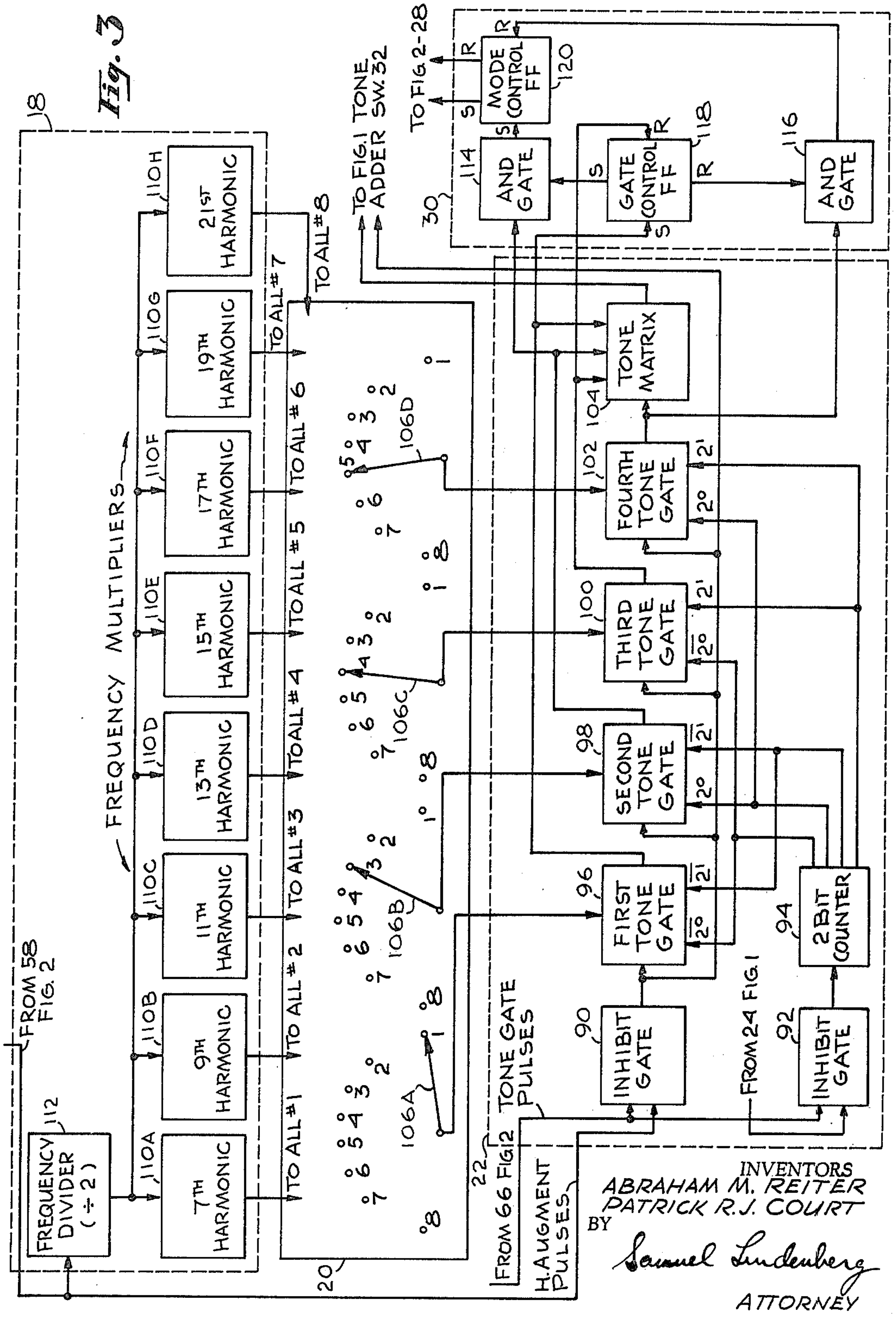
FIGURE 3 is a block diagram illustrating details of a tones generator, permuting switch, tone sequence programmer and augment mode control circuit shown in FIGURE 1.

The timing waveform generator 16 also provides horizontal augmenting pulses which are shown as waveform 7C of FIGURE 7 and tone gate pulses which are similar to that in waveform 70 in FIGURE 7, but without the serrations. The horizontnal augmenting pulses are applied to a tones generator 18, which, as shown in FIGURE 3, generates eight tones which range from the 7th to the 21st harmonic of one-half the horizontal sync frequency. An adjustable permuting switch 20 enables the selection of any four of these. The selected four tones are applied to a tone sequence programmer 22, which, in response to output from a source of random or pseudo random pulses 24, as well as tone gate pulses and horizontal augmenting pulses, provides an output consisting of the four selected tones occurring at predetermined times, in a random sequence.

Two further output signals provided by the timing waveform generator are true augmenting pulses, the waveform of which is shown in FIGURE 7J and 3H gate pulses, the waveform of which is shown in FIGURE 7H. The true augmenting pulses and the 3H gate pulses are applied to a false augmenting pulse generator 26, which in response thereto, generates false augmenting pulses, represented by waveform 7L in FIGURE 7.

The true and false augmenting pulses are applied to a mode switch circuit 28. This switch will provide at its output, true and false augmenting pulses in one of two modes. In one mode, as represented by waveform 7M, true augmenting pulses are positive and false augmenting pulses are negative. In the other mode, as represented by waveform 7N, true augmenting pulses are negative and false augmenting pulses are positive. The one of these two modes which occurs at the mode switch output is determined by an augmenting mode control circuit 30. This circuit, in turn is controlled by tones received from the tone sequence programmer 22.

A tone adder switch 32 operates to combine the selected tones of the tone sequence programmer and the output of the mode switch 28 to provide a composite augmenting signal, represented by the waveform 7P in FIGURE 7. This signal is applied to an amplitude modulator 34. Audio signals from a source of barker audio 36 are frequency modulated by a frequency modulator 38 on a carrier generated by audio carrier generator 39. The output of the frequency modulator is amplitude modulated by the composite augmenting signals in the amplitude modulator 34. The output of the amplitude modulator 34 serves as one input to a triplexer 40.

A second input to the triplexer 40 comprises program audio signals from a source 42, which are frequency modulated on a carrier by a frequency modulated transmitter 44.

The gray sync video, which comprises the output of the gated video suppressing amplifier is applied to an amplitude modulated transmitter 46, to be amplitude modulated on a carrier. The output of the amplitude modulated transmitter 46 is applied to a vestigial sideband filter 48, which is the manner which is well known in the art, removes most of the lower sideband. The output of the vestigial sideband filter is applied to the triplexer 40. The triplexer properly combines its three inputs and applies them to an antenna 50, to be radiated.

Figure 5:
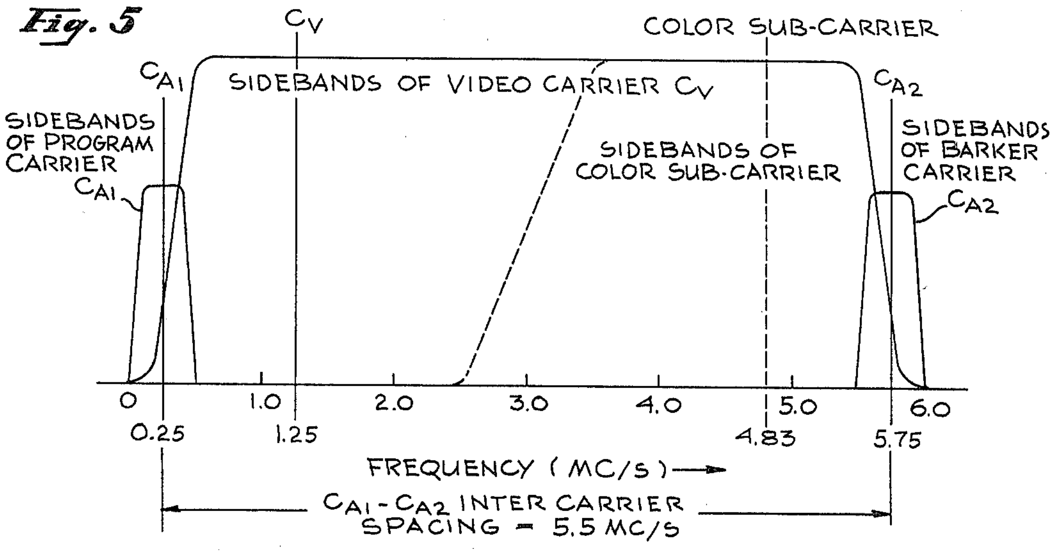
FIGURE 5 is a diagram representing the position of the three carriers employed in the present invention.

The relative frequency positions of the signals which are combined in the triplexer are shown in FIGURE 5. The carrier $C_{A1}$, which carries program audio is at 0.25 mc. above the lower band end of the assigned channel. The carrier $C_V$, which carries grey sync video is centered at 1.25 mc. If a color subcarrier were employed it would be centered at 4.83 mc. The carrier of barker audio and combined augmenting signals $C_{A2}$ is centered at 5.75 mc. Intercarrier spacing between $C_{A1}$ and $C_{A2}$ is 5.5 mc.

FIGURE 2 is a block diagram of the timing waveform generator 16 and the mode switch 28. The timing waveform generator provides certain timing pulses needed to make grey sync video and the augmenting pulses. The composite synchronizing signal output from the stabilizing amplifier 12 is applied to three circuits within the timing waveform generator. One of these is a clamping pulse former circuit 52 which generates clamping pulses represented by 4C in FIGURE 4. Another circuit is a horizontal sync pulse former circuit 54, and the third is a vertical sync pulse former circuit 56. These respectively provide horizontal sync pulses shown in FIGURE 7 as waveform 7B, and vertical sync pulsese shown in FIGURE 7 as waveform 7G. Besides the circuits already specified the timing waveform generator includes a horizontal augmenting pulse former 58, whose output is represented by waveform 7C and a half line augmenting pulse former 60, whose output is represented by waveform 7D and both of these circuits are driven from the output of the horizontal sync pulse former 54. The timing waveform generator also includes 3H gate pulse former 64, and a tone gate pulse former 66, both of which are driven from the ouput of the vertical sync pulse former 56 and the waveforms of which are respectively represented by waveform 7H and a waveform similar to 70, but without the serrations. The outputs of the horizontal augmenting pulse former 58 and the half line augmenting pulse former 60, the 3H gate pulse former 64, and the tone gate pulse former 66, are all applied to an augmenting pulse mixer 68, whose output is applied to a suppressing pulse former 70. Wave shape 4B represents the suppressing pulse former's output. These latter two circuits will also be shown in more detail subsequently herein.

The clamping pulses from the clamping pulse former 52 and the suppressing pulses which are derived from the output of suppressing pulse former 70 are both applied to the gated video suppressing amplifier 14. The gated video suppressing amplifier is an amplifier which may be switched from a normal gain state into a relatively lower gain state during the application of the suppressing pulses. This amplifier also contains a keyed clamp which is operated in response to the clamping pulses to establish the correct DC level at the back porch of the sync. The output of the gated video suppressing amplifier 14 comprises grey sync video whose waveform is represented by 4D in FIGURE 4. It will be seen from the waveform that the synchronizing pulses in the composite video waveform are placed in the grey level region.

Two other outputs which are provided by the timing waveform generator are "true" augmenting pulses which are provided by the augmenting pulse mixer 68, and 3H gate pulses derived from the 3H gate pulse former 64. The "true" augmenting pulses are applied to the false augmenting pulse generator 26, to a channel A true And gate 72, and a Channel B true And gate 74 in the mode switch 28. The output of the false augmenting pulse generator 26 is applied to a channel A false And gate 76 and to a Channel B false And gate 78. A second enabling input to the channel A true And gate 72 and the channel B false And gate 78 is derived from one output of a flip flop in the mode control circuit 30, as will be shown in FIGURE 3. A second enabling input to the channel A false And gate and the channel B true And gate is derived from another output of a flip flop in the mode control circuit 30.

Channel A true And gate and Channel A false And gate outputs are combined in a channel A matrix 80. Channel B true And gate and channel B false And gate outputs are combined in a channel B matrix 82. The channel A matrix output is applied to a channel *A/B* matrix 84, which combines these signals together with those received from the channel B matrix 82, through a phase inverter 86. The And gate, phase inverting and matrix circuits referred to herein are well known in the television art and accordingly circuit details thereof need not be shown.

The four And gates respectively 72, 74, 76, 78, together with the three matrix circuits, respectively 80, 82, 84, function to determine in which of two modes the augmenting pulses are being provided. In one mode, as determined by the mode control flip-flop 120, the output of the channel A true And gate is applied to the channel A matrix and the output of the channel B false And gate is applied to the channel B matrix. Because of the phase inverter 86, the output of the channel *A/B* matrix, which sums these two, will consist of true augmenting pulses having one polarity, positive by way of example, and channel B or false augmenting pulses having an opposite polarity. When channel A false And gate and Channel B true And gate are enabled to provide outputs then the channel A false augmenting pulses have the one polarity and the channel B true augmenting pulses have the opposite polarity. Thus, the two channels here are distinguished by opposite polarity signals and the mode control circuit controls the mode switch to establish in which of two channels the true augmenting pulses are transmitted with the false augmenting pulses being transmitted in the other of the two channels at the time.

FIGURE 3 is a block diagram of the tone generator 18, permuting switch 20, tone sequence programmer 22 and augment mode control circuit 30. The tone sequence programmer includes two inhibit gates respectively 90, 92, a two-bit counter 94, four tone gates respectively 96, 98, 100 and 102, and a tone matrix 104. The inhibit gates 90 and 92 receive as one of their two inputs, tone gate pulses which are provided by a tone gate pulse former 66, which is within the timing waveform generator 16. An inhibiting input to the inhibit gate 90 is the output of the horizontal augmenting pulse former 58 which is in the timing waveform generator 16. The output of the inhibit gate 90 comprises serrated tone gate pulses. (See waveform 70, FIGURE 7.) These are applied to the first, second, third and fourth tone gates respectively 96, 98, 100, and 102, and also to the tone adder switch 32, shown in FIGURE 1. The inhibit gate 92 receives pulses from a random pulse source 24, shown in FIGURE 1. However, it is inhibited from providing an output in the presence of tone gate pulses.

The two-bit counter 94 which comprises two flip flops driven as a counter in response to the random pulse output of the inhibit gate 92, provides four different outputs. These are respectively designated as $\overline{2^0}$, $2^0$, $\overline{2^1}$, and $2^1$. The first tone gate 96 is a four input And gate; its additional inputs are the outputs $\overline{2^0}$ and $\overline{2^1}$. The second tone gate 98 is a four input gate and has as additional inputs the outputs $2^0$ and $2^1$. The third tone gate is a four input gate and has as additional inputs $\overline{2^0}$ and $2^1$, and the fourth tone gate has additional inputs $2^0$ and $2^1$. The fourth input to each one of the four tone gates is one of four outputs from the permuting switch 20. The permuting switch arrangement by way of example, may comprise a set of four selector switches. Each one of the respective selector switches 106A, 106B, 106C, 106D has the output end of its selector arm respectively connected to one of the respective tone gates. The eight contacts of the four selector switches are connected in parallel and each one is connected to a different one of the eight outputs of the respective frequency multipliers 110A through 110H. The respective frequency multipliers generate the odd harmonics from the 7th to the 21st, from the output of a "divide by two" frequency divider 112. The selector switch enables any one of the eight tones to be applied to the four tone gates 96 through 102.

The tones generator continuously supplies tones to all four of the tone gates. The tone gates are interrogated during portions of tone gate pulse time which are not coincident with horizontal augmenting pulses by the output of the inhibit gate 90. Only one of the gates can provide an output at this time as determined by the count state of the two-bit counter 94. As stated above, the horizonal augmenting pulses which occur during a tone gate pulse act to inhibit gate 90 so that no query in response to a tone gate pulse will occur during the interval of a horizontal augmenting pulse. The sequence of tones provided by the tone sequence programmer will be random or psuedo random entirely in accordance with the type of pulse source 24 that is used to drive the counter. The outputs from each of the tone gates are combined in the tone matrix 104, which merely comprises a resistive adder circuit.

The outputs of the tone matrix 104 and of the inhibit gate 90 *are* applied to the tone adder switch 32. The tone adder switch 32 is the electronic equivalent of a single-pole, double-throw switch, which provides as its output the combined augmenting pulses from the mode switch 28 except in the presence of serrated tone gate pulses when it selects as its output the output of the one matrix 104. The output of the tone added switch is a composite augmenting signal, the waveform of which is represented by 7P in FIGURE 7, which is applied to the amplitude modulator 34. It will be seen from the waveform that the selected control tones are only transmitted during vertical retrace time.

The augmenting mode control circuit 30 includes two And gates respectively 114 and 116, and a gate control flip-flop 118. The gate control flip-flop is driven between its set and reset states in response to the respective tone outputs of the first tone gate and the third tone gate. And gate 114, in order to provide an output, requires both the output of the gate control flip-flop 118 when in its set state and an input from the second tone gate 98. The output of And gate 114 drives a mode control flip-flop 120 to its set state. And gate 116 provides an output to drive the mode control flip-flop 120 to its reset state when it receives a reset output from the gate control flip-flop 118, and the output from the fourth tone gate 102. The mode control flip-flop 120, when in its set state, provides a "mode" A or channel A true and channel B false augmenting request of the mode switch 28. When in its reset state the mode control flip-flop provides a "mode B" or channel A false and channel B true augmenting request from the mode switch 28. It can thus be seen that mode switching is determined in response to the tone selection sequence which sequence occurs at a random or psuedo random rate.

The permuting switch makes available a total of 8 x 7 x 6 x 5 or a total of 1680 useful tone combinations. In the embodiment of the invention which was constructed, the permuting switch was operated using punched cards for operating convenience. The reason that the tone frequencies are made odd multiples of one-half the horizontal sync frequency is to allow them to be separated at the receiver from the horizontal sync frequency and its harmonics.

The purpose of the false augmenting pulses is to give false synchronizing information to a receiver which is not set to the proper code, but it is also necessary to insure that an unauthorized receiver cannot use the false pulses as a signal for switching between augmenting channels. As will become apparent in the explanation of the receiver, in accordance with this invention, it is also desirable for the false pulses to be used to derive a negating function. These are two conflicting requirements. On the one hand it is necessary to distinguish the false from the true pulses in order to derive the negating function. On the other hand it is desirable to make the false and true pulses the same, or as nearly the same as possible, in order to avoid unauthorized detection of the switching times. A satisfactory solution is to send two types of false pulses, the first occurring at a frequency substantially different from the true augmenting pulse frequency to be used for deriving the negating function. The second form of the false pulses has the same frequency as the true pulses but differs only in phase. The form of the false pulses which are transmitted may be changed from time to time. This would prevent an unauthorized receiver from determining the correct switching times by looking for pulses that occur at a frequency substantially different from the true augmenting frequency. It would also allow the derivation of a negating function in an authorized receiver by searching for false pulses which occur at a frequency substantially different from the true pulse frequency.

Figure 6:
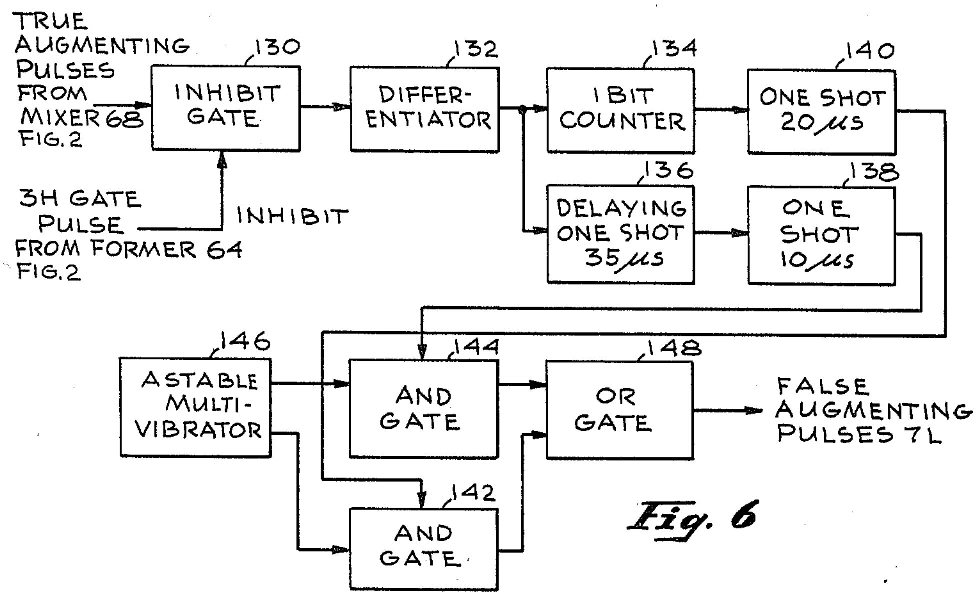
FIGURE 6 is a block diagram representing a "false pulse" former which may be used with this invention.

A block diagram of a false augmenting pulse generator is shown in FIGURE 6. A false augmenting pulse waveform is represented in FIGURE 7L with the portion of $7L_1$ of the wave shape representing one type of false augment pulse and the portion $7L_2$ representing a second type of false augmenting pulse. The form of augment pulse $7L_1$ occurs at one-half of the horizontal scanning frequency and is phased so that it occupies approximately the first one-third of the active video interval. The second form of the false augmenting pulse $7L_2$ occurs at the horizontal line frequency but is displaced so that it occupies a position past the middle of the active video interval. The pulses that occur at half the true augmenting frequency are made double width in order to equalize the DC component of the two forms of false pulses. Although both forms of the false augmenting pulses are shown in the single waveform line it is not intended that the switching from one to another occurs at the time shown. It is intended that the switching will occur at times that are totally unrelated to the vertical and horizontal scanning frequencies.

Referring now to FIGURE 6, the true augmenting pulse mixer 68, and an inhibiting input comprising the 3H gate pulses from the gate pulse former 64, are applied as two inputs to an inhibit gate 130. The inhibit gate output is connected to a differentiator circuit 132. The output of the differentiator circuit 132 is applied to a one-bit counter 134, and to a delaying one shot circuit 136. This circuit provides a delay interval of 35 microseconds before its output is applied to a one shot multivibrator 138. The one shot circuit 138 provides an output pulse, the width of which is 10 microseconds. The one-bit counter 134 drives a one shot multivibrator circuit 140. The output of the one shot circuit 140 in response to a pulse from the one-bit counter 134 is a pulse having a width on the order of 20 microseconds.

The output of the one shot multivibrator 138 comprises false augmenting pulses occurring at the horizontal augmenting frequency. The output of the one shot multivibrator 140 is connetced to an And gate 142 and the output of the one shot multivibrator 138 is connected to an And gate 144. An astable multivibrator 146 alternately gates on the And gates 142 and 144. Their outputs are applied to an Or gate 148, the output of which may comprise either the output of And gate 142 or the output of And gate 144, and constitutes the false augmenting pulse. The frequency of the astable multivibrator is not critical. It may be one cycle per second for example. The output of And gate 144 is represented by the false augmenting pulse waveform $7L_2$. The output of And gate 142 is represented by the false augmenting pulse waveform $7L_1$.

As explained previously, the true and false augmenting pulses are combined in the mode switch in one of two possible modes. Waveform 7M represents one mode of transmitting the true and false augmenting pulses and waveform 7N represents another mode for transmitting true and false augmenting pulses. In waveform 7M the false augmenting pulses are transmitted negatively and the true augmenting pulses are transmitted positively. In waveform 7N the false augmenting pulses are transmitted positively and the true augmenting pulses are transmitted negatively.

As previously explained, the tone adder switch 32 in FIGURE 1, forms the composite augmenting signal by switching between the combined augmenting pulses and the tones in accordance with the serrated tone gate signal. Wave shape 70 shows the serrated tone gate waveform and wave shape 7P shows the composite augmenting signal. This comprises the true and false augmenting pulses, plus tones which are transmitted during the vertical retrace interval. The particular tone shown in the waveform 7P is the lowest frequency, which is the 7th harmonic of one-half of the horizontal scanning frequency. It will be noted that the amplitude of these tones is equal to the peak-to-peak amplitude of the composite augmenting signal. In the receiver this assures that the tones will be present regardless of which channel ( positive or negative) is used.

Figure 8:
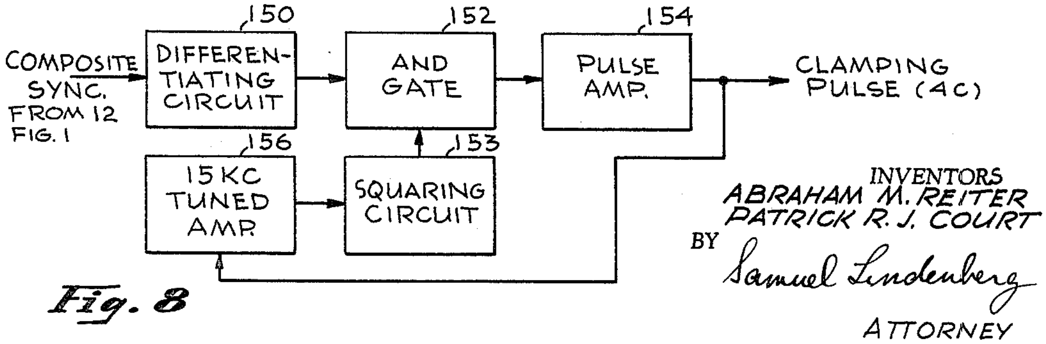
FIGURE 8 is a block diagram of the clamping pulse former circuit which may be used with this invention.

FIGURE 8 is a block diagram of the clamping pulse former circuit 52 (FIGURE 2). The composite sync signals which are received from the stabilizing amplifier 12 are applied to a differentiating circuit 150. The output of the differentiating circuit is applied to an And gate 152, which has as its second required input, the output of a squaring circuit 153. The output of the And gate 152 is applied to a pulse amplifier 154. The output of the pulse amplifier is fed back to a 15 kc. tuned amplifier 156. The tuned amplifier output is fed to the squaring circuit 153 which serves to enable the And gate 152. The And gate 152 is open in the absence of an output from the squaring circuit. The output of the pulse amplifier 154 comprises the clamping pulses 4C. The And gate 152 serves to inhibit any clamping pulses which may appear at the half lines. The reason for this is to prevent any disturbance to the grey video during the three equalizing pulse intervals that are not suppressed. These are the three equalizing pulses that occur at the half lines preceding vertical sync. No squaring pulses will appear during the half line intervals and thus the And gates suppress the clamping pulses during this interval.

Figures 9, 12:
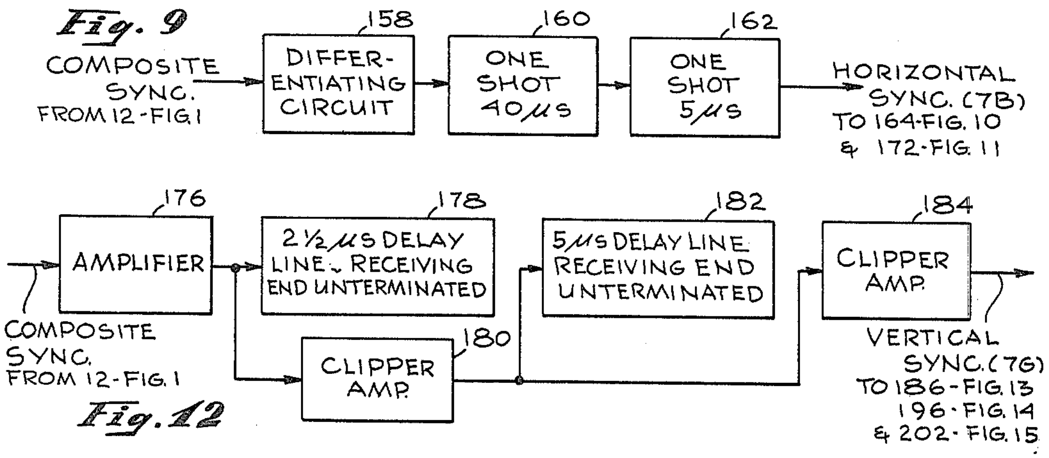
FIGURE 9 is a block diagram of the horizontal sync former circuit which may be used with this invention.
FIGURE 12 is a block diagram of a vertical sync pulse former circuit which may be used with this invention.

FIGURE 9 is a block diagram of the horizontal sync former circuit 54 (FIGURE 2) which may be employed with this invention. The composite sync is applied to a differentiating circuit 158. The output is applied to a one-shot multivibrator circuit 160, whose period is adjusted approximately to 40 microseconds for the purpose of ignoring any triggering pulses that occur at half lines. The leading edges of the output of the one-shot 160 trigger a second one-shot multivibrator 162, whose period is adjusted to the proper horizontal sync width, which is approximately 5 microseconds. The output of the one-shot 162 is horizontal sync represented by wave shape 7B.

Figures 10, 11:
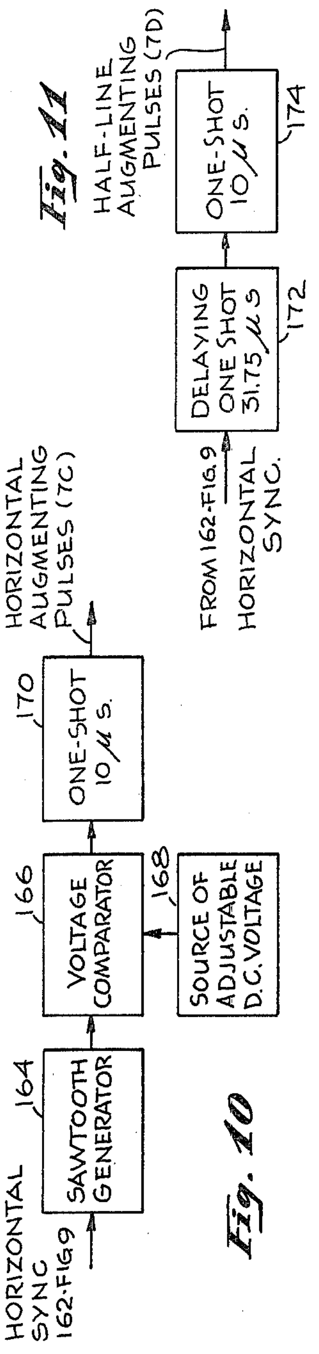
FIGURE 10 is a block diagram of the horizontal augmenting pulse former circuit which may be used with this invention.
FIGURE 11 is a block diagram of a half-line horizontal augmenting pulse former circuit which may be used with this invention.

The horizontal augmenting pulse former 58 (FIGURE 2) which receives these horizontal sync pulses is represented by the block diagram of FIGURE 10. A sawtooth generator 164 receives a horizontal sync pulse and generates sawtooth pulses in response thereto. The output of the sawtooth generator is applied to a voltage comparator 166. A source of adjustable DC voltage 168 is also applied to the comparator. The output of the voltage comparator 166 is a sharp trigger pulse at the point where the sawtooth pulse matches the DC voltage from the source 168. This trigger drives a one shot multivibrator 170, whose width is adjusted to approximately 10 microseconds. The position on the sawtooth at which the voltage comparator is set to trigger is adjusted so that the horizontal augmenting pulses straddle the normal horizontal retrace interval. This requires that the leading edges of the augmenting pulses precede the horizontal sync pulses by about 1.5 microseconds. In the receiver, the augmenting pulses are recovered from a channel whose bandwidth is much narrower than the video channel. This serves to delay the augmenting pulses with respect to the video by approximately 2 microseconds. In order to compensate for this delay an additional 2 microseconds of advance is introduced into the horizontal augmenting pulses. This accounts for the total advance of about 3.5 microseconds. The horizontal augmenting pulse former provides the horizontal frequency components of the true augmenting signal. These pulses are represented by the wave shape 7C.

FIGURE 11 is a block diagram of the half line augmenting pulse former circuit 60 (FIGURE 2). This simply comprises a delaying one-shot multivibrator 172 whose period is adjusted to one-half of that of a horizontal line, 31.75 microseconds. The output of this one-shot 172 drives a second one-shot multivibrator 174, which provides half line augmenting pulses having a width of 10 microseconds. These are represented by wave shape 7D.

FIGURE 12 is a block diagram of the vertical sync former circuit 56, shown in FIGURE 2. The composite sync is applied to an amplifier 176, the output of which is used to drive a delay line 178, and a clipper amplifier 180. The delay line has a propagation time of two-and-a-half microseconds and is not terminated at the receiving end. As a result, the pulses applied to the delay line are reflected from the open end and arrive at the receiving end without phase inversion 5 microseconds later. The horizontal sync and equalizing pulses are represented by wave shape $7E_1$ and the serrated vertical sync pulses are represented by wave shape $7E_2$. The serrated vertical sync pulses are twice the amplitude of the horizontal sync pulses but the serrations in vertical sync are widened. By adjusting the clipping level of the clipper amplifier 180 to reject pulses below a predetermined clipping level, the clipper amplifier will amplify only serrated vertical sync pulses represented as $7E_2$. The output of the clipper amplifier 180 is applied to a delay line 182, and to a clipper amplifier 184. Delay line 182 has a propagation time of 5 microseconds and is also unterminated at the receiving end. The output of clipper amplifier 180 is the sum of the incident and reflected pulses represented as 7F. By adjusting the clipping level of clipper amplifier 184 to reject signals below a predetermined clipping level, the clipper amplifier will amplify only the vertical sync pulse. In this manner the serrations are completely removed from the output of the clipper amplifier 184. The output of the clipper amplifier 184 is represented by the wave shape 7G.

Figures 13, 14, 15:
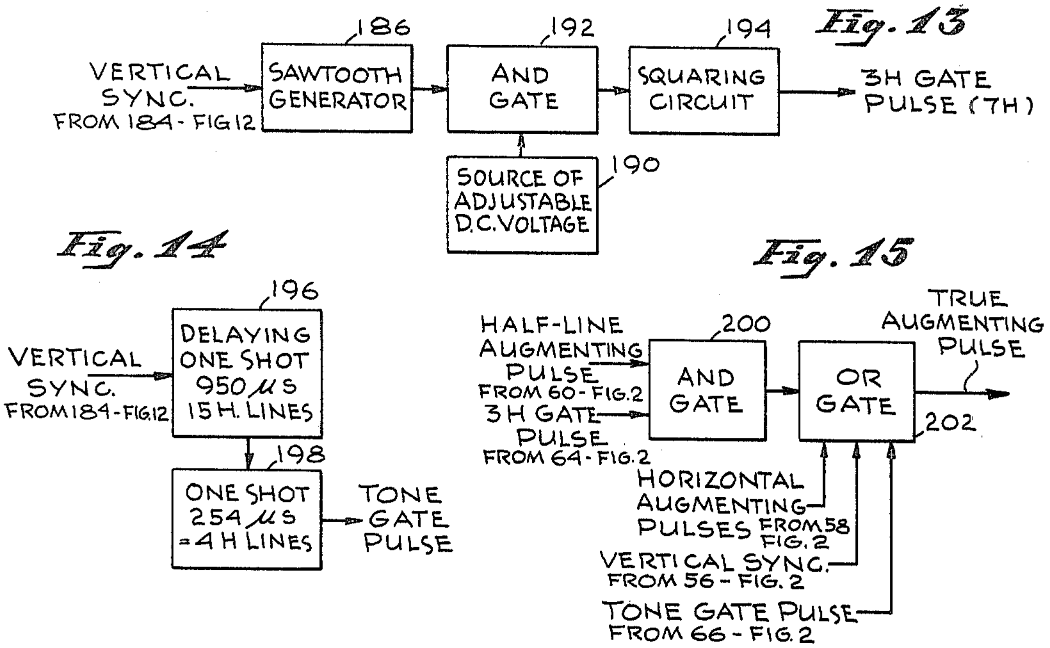
FIGURE 13 is a block diagram of a 3H gate pulse former circuit which may be used with this invention.
FIGURE 14 is a block diagram of a tone gate pulse former circuit which may be used with this invention.
FIGURE 15 is a block diagram of an augmenting pulse mixer circuit which may be used with this invention.

FIGURE 13 is a block diagram of the 3H gate pulse former circuit 64 (FIGURE 2). The purpose of the 3H gate pulse former is to select the three half line augmenting pulses which precede vertical sync. Vertical sync from the vertical sync pulse former 56 in FIGURE 2 is applied to the sawtooth generator 186. The output of the sawtooth generator and a source of adjustable DC voltage 190 are applied to an And gate 192. The output of the And gate is the tip of the sawtooth which is applied to a squaring circuit 194. The output of the squaring circuit is the 3H gate pulse. This output precedes vertical sync and ends when vertical sync begins. It is represented by FIGURE 7H.

FIGURE 14 is a block diagram of the tone gate pulse former 66 (FIGURE 2). The output of the vertical sync pulse former 56 is connected to a delaying one shot multivibrator 196 whose period is adjusted to 15 horizontal line periods. The output of the delaying one shot is connected to another one shot multivibrator 198 whose period is adjusted to 4 horizontal line periods. The output, is tone gate pulses, similar to waveform 70, but without serrations.

FIGURE 15 is a block diagram of the augmenting pulse mixer 68 (FIGURE 2). The half line augmenting pulses and the 3H gate pulses are applied to an And gate 200. The output of the And gate together with horizontal augmenting pulses, vertical sync pulses and tone gate pulses is applied to an Or gate 202. The output of the Or gate 202 represents the true augmenting pulse waveform represented by the wave shape 7J in FIGURE 7.

Figure 16:
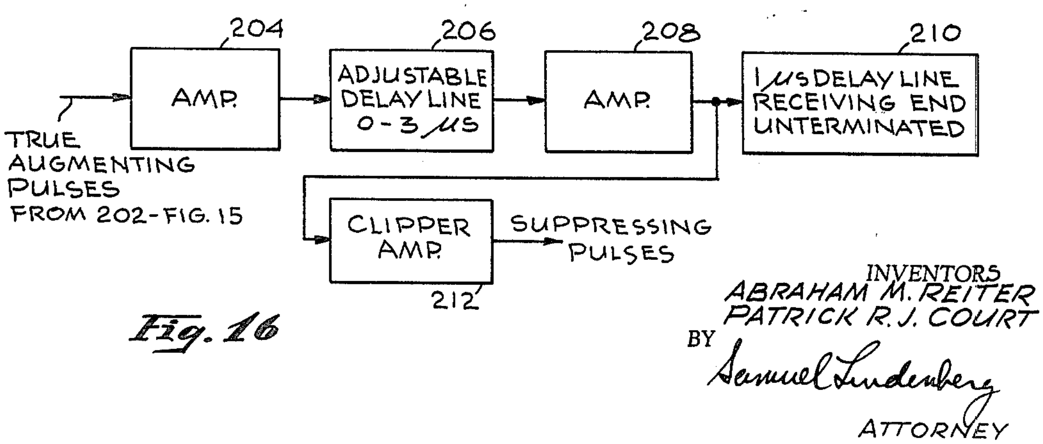
FIGURE 16 is a block diagram of a suppressing pulse former circuit which may be used with this invention.

The relationship of the suppressing pulses to the augmenting pulses must be carefully controlled. In particular, the suppressing pulses must be wider than the augmenting pulses. Furthermore, they must be delayed with respect to the augmenting pulses in order to compensate for the differential delay between the video and augment channels in the receiver. A detailed block diagram of the suppressing pulse former 70 (FIGURE 2) is shown in FIGURE 16. The true augmenting pulses are applied to an amplifier 204 whose output drives an adjustable delay line 206. The delay introduced compensates for the advance which previously was introduced by the augmenting pulse circuits. This method of deriving suppressing pulses from the augmenting pulses insures a very precise and stable timing relationship between the suppressing and augmenting pulses. The output of the delay line 206 is applied to an amplifier 208. The output of amplifier 208 is connected to a delay line 210 and to a clipper circuit 212. Delay line 210 has an unterminated receiving end so that the waveform appearing at its input is the sum of the incident and reflected pulses. The resulting waveform is a series of pulses whose trailing edges have been delayed, just as the trailing edge of vertical sync is delayed as shown in waveform 7E in FIGURE 7. The purpose of introducing this delay is to make all of the suppressing pulses wider than the corresponding augmenting pulses. The combination of delaying and widening the augmenting pulses with delay lines automatically insures that the suppressing pulses will straddle the augmenting pulses.

Figure 17:
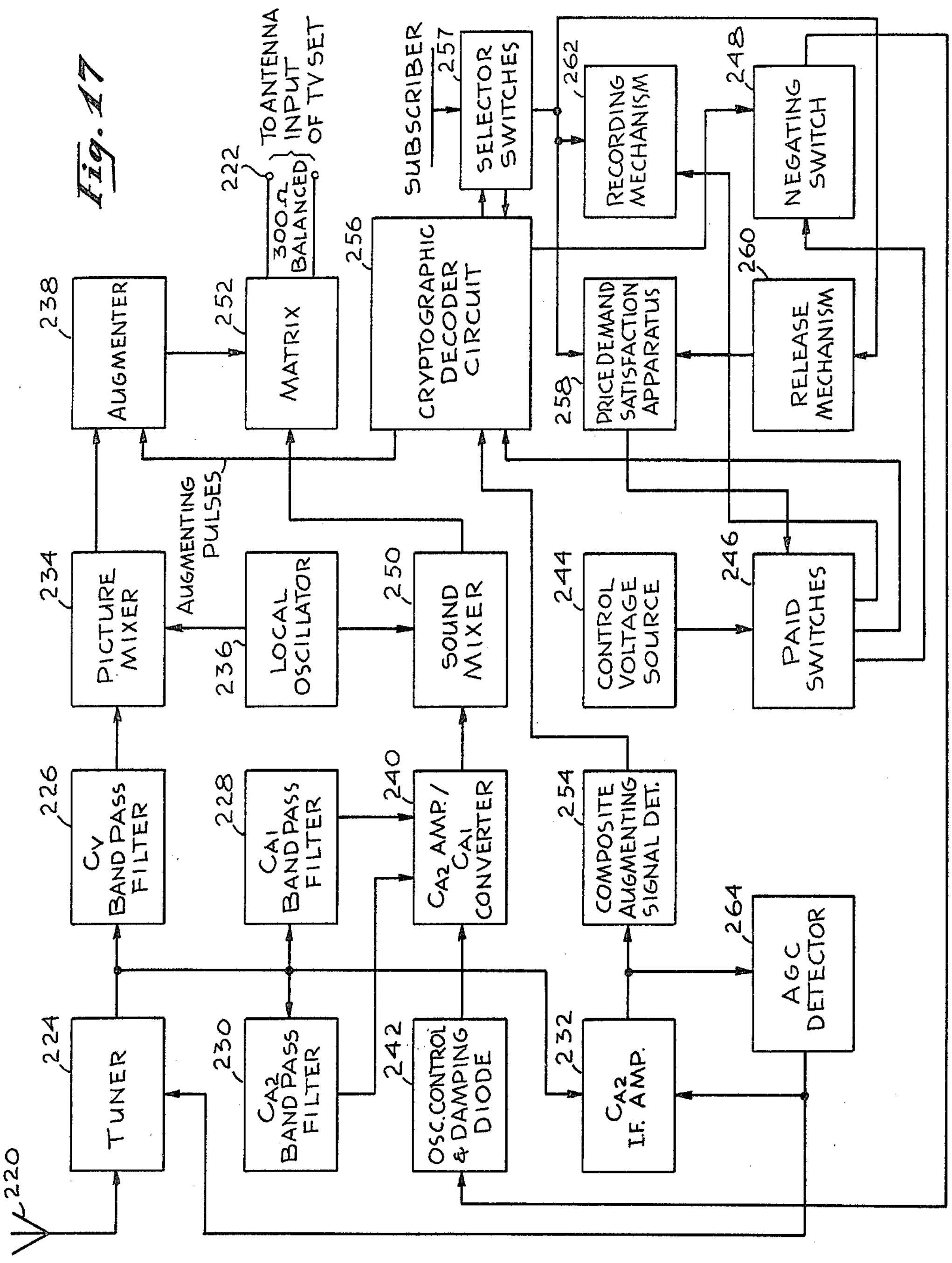
FIGURE 17 is a block diagram of a receiver attachment in accordance with this invention.

FIGURE 17 is a block diagram of an attachment for enabling a receiver to receive and intelligibly present the signals generated by the transmitter which has just been described. This attachment is connected between the receiver antenna 220, and the antenna input terminals of the receiver. The received signals on the antenna are applied to a tuner 224, which is the usual type of tuner which is employed in a television receiver. The tuner heterodynes the received carrier signals to suitable intermediate frequencies. The output of the tuner is applied to a $C_V$ bandpass filter 226, which passes only the carrier modulated with gray sync video signals. The tuner output is also applied to a $C_{A1}$ bandpass filter 228, and a $C_{A2}$ bandpass filter 230, which respectively pass the carrier modulated with program audio and the carrier modulated with barker audio together with the composite augmenting signal. The output of the tuner 224 is also applied to a $C_{A2}$ IF amplifier 232.

The output of the $C_V$ bandpass filter 226 is applied to a picture mixer circuit 234. A local oscillator circuit 236 provides a second input to the picture mixer circuit 234. The picture mixer heterodynes the video IF frequency to a predetermined television channel frequency. The mixer output is applied to the augmenter 238. The function of the augmenter, when suitably actuated, is to restore the grey sync video to normal composite video. This circuit operation will be described subsequently herein.

The $C_{A1}$ bandpass filter rejects the $C_{A1}$ and $C_V$ carrier frequency components and passes only the program audio IF. This output is applied to a dual purpose $C_{A2}$ amplifier $C_{A1}$ converter 240. A second input to this amplifier converter is obtained from the $C_{A2}$ bandpass filter which passes the barker audio IF and rejects the other two carriers. A third input to the amplifier converter is obtained from the oscillator control and damping diode circuit 242. The oscillator control and damping diode circuit is supplied with a control voltage which is derived from a source 244. This voltage is applied through paid switch circuits 246, when a demanded price for viewing a program has been paid, and then through a negating switch 248 to the oscillator control and damping diode.

When the control voltage is permitted to pass to the damping diode through these intervening circuits the oscillator control and damping diode causes the amplifier converted to function as a crystal controlled converter, simultaneously damping the output of the $C_{A2}$ bandpass filter 230. In this condition, a 5.5 mc. crystal oscillator is provided which converts the $C_{A1}$ carrier to the frequency position occupied by the $C_{A2}$ carrier. The output of the amplifier converter 240 therefore is program audio at a nominal IF frequency which is identical to the IF frequency of the barker audio. The barker audio $C_{A2}$ is short circuited by the oscillator control and damping diode and does not appear in the output of the converter amplifier 240.

The output of the converter amplifier 240 is applied to a sound mixer 250. A second input to the sound mixer is the output of the local oscillator 236. The function of the sound mixed is to heterodyne the sound IF frequency to its proper frequency location in the predetermined standard television channel. The output of the output sound mixer 250 is applied to a matrix 252 which combines the sound carrier with the augmented composite video carrier. The output of the matrix 252 is applied to the antenna input terminals of the TV receiver and can then be intelligibly reproduced by the subscriber's receiver.

If there is no control voltage applied to the oscillator control damping diode, the crystal oscillator function is interrupted and the converter circuit 240 operates as an amplifier. The output of the $C_{A2}$ bandpass filter 230 is then amplified and applied to the sound mixer 250 which converts it to the predetermined carrier frequency for combination with the output of the augmenter circuit 238. The subscriber receiver will then reproduce the barker sound but will not reproduce the program audio. The $C_{A2}$ amplifier $C_{A1}$ converter 240 at this time is amplifying the $C_{A2}$ carrier and not converting the $C_{A1}$ carrier. Therefore, despite the fact that the output of the $C_{A1}$ bandpass filter 228 is still applied thereto it remains at the same frequency so that it does not interfere with the subsequent reproduction of the barker audio signals.

The output of the matrix circuit 252 which is applied to the output terminals 222 comprises one video carrier and one audio carrier. The audio carrier will be either $C_{A1}$ transposed to the correct audio position, or $C_{A2}$ depending upon the state of the "paid" switch and the negating switch which connect the oscillator control damping diode 242 to the control voltage source 244. These will be shown in more detail subsequently herein.

The function of the augmenter circuit 238 is to restore the modulation envelope on the picture carrier to a normal waveform, thereby making it intelligible to a normal television receiver. The augmenter comprises a circuit whose transmission characteristics may be modified by the application of augmenting pulses. More particularly, the transmission is multiplied by some factor during the augmenting pulse intervals. If, for example, the suppression at the transmitter had suppressed the video during the suppressing pulse intervals by a factor of 2, the augmenter multiplies the transmission by a factor of 2 during the augmenting pulse intervals.

An augmenting signal detector circuit 254 recovers the composite augmenting signal from the modulation envelope of the second audio carrier ($C_{A2}$) which is received from the $C_{A2}$ IF amplifier 232. The output of the augmenting signal detector is supplied to the crytographic decoder circuit 256. As will be shown in more detail subsequently herein, a subscriber is required to set certain selector switches correctly in order to establish a price which he must pay in order to enable his receiver to receive signals which it can intelligibly reproduce. If the subscriber sets these selectors correctly and then pays the price demand, which is indicated by price demand satisfaction apparatus 258, the cryptographic detector will deliver true augmenting pulses to the augmenter circuit 238. At the same time a recording mechanism 262 is activated by a control voltage from the paid switches 246. The recording mechanism records the position of the selector switches 257.

If the subscriber correctly sets the selector switches 257 and satisfies the price demand satisfaction apparatus, the paid switches 246 will be closed. As a result, the control voltage can be applied to the oscillator control damping diode circuit 242, to the recording mechanism 262, and to the cryptographic decoder circuit 256. If the subscriber has not correctly set the selector switches 257, but still satisfies the price demand indicated by the price demand satisfaction apparatus 258, the cryptographic decoder circuit 256 will cause the negating switch 248 to open, which results in the output sound becoming barker sound. The picture will not be correctly restored, because the augmenting pulses will be false for a substantial portion of the time.

If the subscriber has set the selectors correctly, the augmenting pulses will always be true and the sound will always be the program sound. When a new program is to be transmitted, a new setting of the selectors will be specified. When the subscriber moves any one of the selectors, the release mechanism 260 enables the price demand satisfaction apparatus 258 to release the paid switches to 246 to their unpaid or open positions. The subscriber must then again satisfy the price demand satisfaction apparatus in order to enjoy the new program. The release mechanism 260 is not released by inadvertence, accident, signal failing, power failure or any other cause. Only the conscious movement of the selector switches 257, by the subscriber accomplishes this. Should all of the signals fade for any period of time the receiver attachment restores itself correctly as soon as the signals reappear.

The AGC detector 264 derives a control voltage from the output from the $C_{A2}$ IF amplifier 232, to regulate the gain of the IF amplifier 232 as well as the tuner 224. The control voltage obtained is proportional to the level of the output from the $C_{A2}$ IF amplifier 232.

Figure 18:
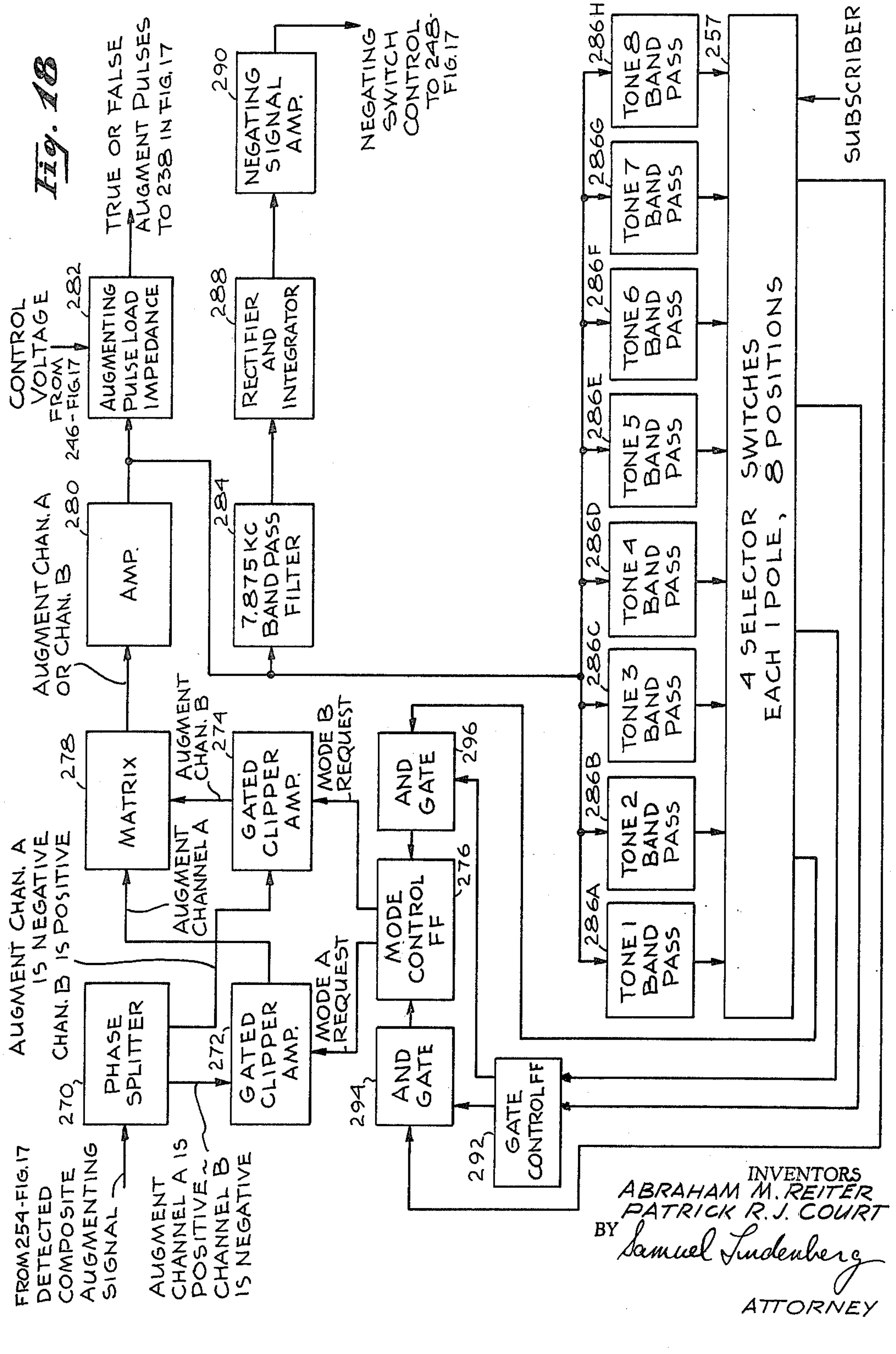
FIGURE 18 is a block diagram of the cryptographic decoder circuit employed in the receiver.

FIGURE 18 is a block diagram of the cryptographic decoder circuit 256 and selector switches 257 (FIGURE 17). The detected composite augmenting signals from the detector 254 are applied to a phase splitter 270. Phase splitter 270 derives two oppositely phased signals. On one output of the phase splitter the augmenting channel A will be positive, and on the other output of the phase splitter the augmenting channel A will be negative. One output of the phase splitter is connected to a gated clipper amplifier 272, and the other output is connected to a gated clipper amplifier 274. A mode control flip-flop 276, has one of its outputs, designated as a Mode A request output, applied to the gated clipper amplifier 272, and the other of its outputs, designated as a Mode B request output, applied to the gated clipper amplifier 274.

The clipping level of each gated clipper amplifier is set so that only positive pulses can cause any output to appear at the output of the gated clipper amplifiers. The output from gated clipper amplifier 272 corresponds to the augmenting channel A at the transmitter and the output from gated clipper amplifier 274 corresponds to augmenting channel B at the transmitter. The two outputs are summed in the matrix circuit 278, the output of which is applied to an amplifier 280. Pulses from only one gated clipper amplifier are present at any time determined by the state of the mode control flip-flop 276. The amplifier 280 drives ten loads simultaneously. These comprise an augmenting pulse load impedance 282, a 7.875 kc. bandpass filter 284, and eight tone bandpass filters respectively 286A through 286H. The output from the augmenting pulse load impedance 282, consisting of augmenting pulses, is applied to the augmenter 238.

The output of the 7.875 kc. bandpass filter 284 is applied to a rectifier and integrator 288, the output of which is connected to a negating signal amplifier 290. At least some of the false augmenting pulses are sent at a frequency of 7.875 kc. If the receiver selector switches 257 are not set correctly some false augmenting pulses will be received and detected by the rectifier and integrator 288. The output of the rectifier and integrator 288 is amplified by the negating signal amplifier 290 and is used to open the negating switch 248 to interrupt the control voltage as explained previously. If the receiver selectors have been correctly set, there will never be any 7.875 kc. false augmenting pulses applied to the bandpass filter 284 and therefore the negating switch will remain closed.

The received tones are applied to the respective tone bandpass filters to be separated out into eight separate lines. These lines are then connected to a selector switch arrangement 257, which is substantially identical with that shown previously for the transmitter. The switching arrangement 257 selects four of the eight tones which are provided and applies them to a mode control circuit, substantially identical with the mode control circuit at the transmitter. At the receiver this includes a gate control flip-flop 292, which applies one of its outputs to an And gate 294 and the other of its outputs to an And gate 296. The outputs from the two And gates are applied to drive the mode control flip flop 276 between its two mode request positions. The functioning of the mode control circuits in the receiver is exactly the same as the functioning of the mode control circuits in the transmitter.

The waveform of the true augmenting pulses as they appear at the input to the augmenter is represented by waveform 4E in FIGURE 4. The waveform of the augmented modulation envelope as it appears at the output of the matrix 252, shown in FIGURE 17, is represented by the waveform 4F in FIGURE 4. This is the same waveform that is applied to the kinescope of the television receiver.

Since it is not practical to obtain precise coincidence of the edges of the suppressing and augmenting pulses, there will inevitably be transients at the leading and trailing edges of all pulses. In the construction of the grey sync video waveform great attention has been devoted to the form of these transients so that no objectionable distortion will be evident in the restored video. The main requirements are that these transients shall not interfere with the synchronizing of the picture and shall not be visible in the picture. In order to achieve this the narrower augmenting pulses are straddled by the suppressing pulses. This results in unrestored tails as indicated in the waveform 4F in FIGURE 4. Since these unrestored tails are in the white going direction they cannot interfere with the synchronizing pulses, thereby assuring that there will be no interference with the proper synchronization in the television receiver.

When the vertical blanking interval starts there are normally six equalizing pulses which occur at twice the line scanning frequency. All of these pulses are suppressed and restored leaving unrestored tails during the half line as well as during the full line pulses since these are the last three lines at the bottom of the picture, and since most television receivers are overscanned vertically, the half line unrestored tails are not visible. Even if the receiver were not overscanned, all that would be visible are three closely spaced pairs of dots at the very bottom of the picture. These are not at all objectionable.

After the first six equalizing pulses the vertical sync pulse itself appears. This entire interval is suppressed and restored so that there is no disturbance whatsoever with the vertical synchronization nor with the interlace. The interlace is not upset because the six equalizing pulses preceding the vertical sync have been very carefully restored. In the three lines following vertical sync it is not desirable that all six equalizing pulses be suppressed and augmented because the half line unrestored tails would be visible during the vertical retrace of the scanning beam. For this reason, only the equalizing pulses which occur at the full line intervals are suppressed and augmented. The remaining tails appear at the right and left edges of the picture as they do for any other horizontal interval. Again, these edges are not visible on a normal receiver because most receivers are overscanned horizontally. The 18th, 19th, 20th and 21st lines that follow the start of the vertical blank are suppressed. The augmenting function contains both augmenting pulses and tones. The synchronizing pulses during these four lines are restored correctly, but the blanking level will be chopped by the tones. Again, this effect will not be noticeable because the tones will appear at the verp top of the picture where a slight amount of overscanning will render them completely invisible.

It will be noted that of the six horizontal sync equalizing pulses which occur after vertical sync, three are suppressed and augmented again and three are not touched at all. If the augmenting does not match the suppressing precisely, the six equalizing pulses will not all be of the same amplitude. However, this does not cause any disturbance to the proper synchronization of the picture because these pulses are of small amplitude and short duration. If it is so desired, however, these three half line equalizing pulses may be eliminated at the transmitter, without any deterioration of synchronizing performance at the receiver.

Figure 19:
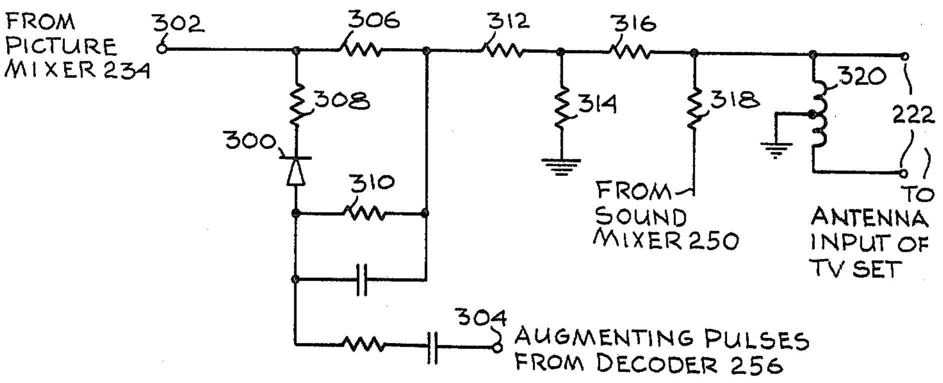
FIGURE 19 is a circuit diagram of the augmenter 238.
Figure 20:
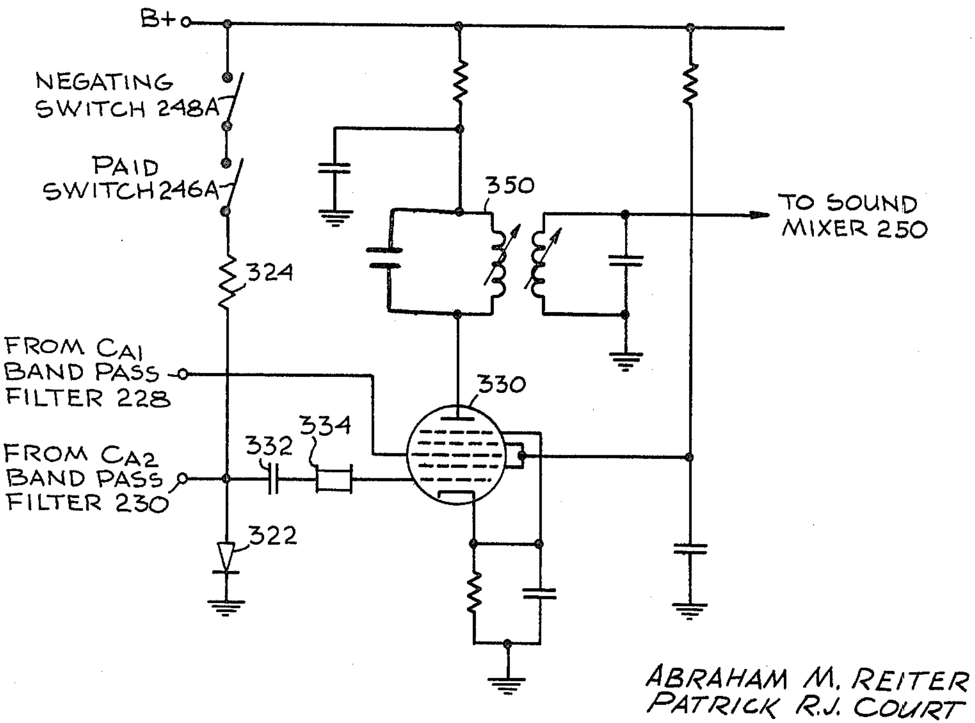
FIGURE 20 is a circuit diagram of the oscillator control damping diode 242 and $C_{A2}$ amp/$C_{A1}$ converter 240 shown in FIGURE 17.

FIGURES 19, 20 and 21 are circuit diagrams of those portions of the receiver attachment in FIGURE 17 and the cryptographic control section in FIGURE 18, the circuitry for which is not commonly known to those skilled in the art. Circuits such as the tuner, the bandpass filters, the mixers, oscillators and detectors, as well as flip-flops are well known in the art and consequently details thereof need not be shown herein. The augmenter circuit 238 is shown in FIGURE 19. The augmenter effectively comprises an attenuator whose loss may be controlled by switching a diode 300 from one impedance level to another in response to augmenting pulses which are applied thereto. In the intervals between augmenting pulses diode 300 is non-conductive and its impedance is high; thus the attenuation of the network through which the video carrier is passed from terminal 302 is relatively high. This network comprises the resistor 306 which has connected thereacross a resistor 308 in series with the diode 300 in series with a resistor 310. When the augmenting pulses are applied to the terminal 304 these render the diode conductive. Therefore, the network including resistors 306, 308, 310, and the diode 300 has a lower impedance with a consequent less attenuation of the video carrier whereby the portion of the viedo carrier occurring during this interval is attenuated less than the preceding portion and thus is relatively augmented.

Resistor 306 is connected in series with a resistor 312. Resistor 312 is connected to a resistor 314 which is connected to ground and to another resistor 316. The signal from the sound mixer 250 is applied to a resistor 318 which is connected to the resistor 316. The junction of resistors 316 and 318 is connected to one terminal of a center-tapped transformer 320. As the center-tap of 320 is grounded, the transformer converts the unbalanced input to a balanced output across its terminals 222. Terminals 222 connect to the antenna terminals of the TV receiver. The resistors 316 and 318 comprise the matrix 252, shown in FIGURE 17, which combines the sound and video carriers.

FIGURE 20 shows the circuit details represented by the rectangles oscillator control damping diode 242 and $C_{A2}$ amplifier $C_{A1}$ converter 240, shown in FIGURE 17. The oscillator control and damping diode 322 is connected to a resistor 324 which is in series with the paid switch 246A and the negating switch 248A. The signals from the $C_{A2}$ bandpass filter 230 are applied to the junction of diode 322, condenser 332 and resistor 324. When both negating switch and paid switch are closed the diode is forward biased from the operating potential source whereby it presents a low impedance to the barker audio carrier and it is therefore highly attenuated. In addition, a low impedance RF path is provided to ground for the crystal 334, through the capacitor 332, which enables the tube 330 to function as a crystal-controlled converter, with an injection oscillator frequency of 5.5 mc. The program audio carrier which is at a frequency of 46.75 mc. is converted to an output frequency of 41.25 mc. This effectively transposes the program carrier to the normal position of the sound carrier in the IF spectrum. This frequency is then selected by the tuned load 350 and applied to the sound mixer circuit 250 which follows this circuit. When the diode 322 is not conducting due to either or both of the switches 246A, 248A being open, then the pentagrid converter tube 330 simply operates as an amplifier for the barker audio carrier which is at a frequency of 41.25 mc.

FIGURE 21 discloses details of certain portions of FIGURE 17. In particular, it discloses in more detail the contents of rectangles 256 (cryptographic decoder circuit), 257 (selector switches), 258 (price demand satisfaction apparatus), 262 (recording mechanism), 260 (release mechanism), 248 (negating switch) 246 (paid switches), and 244 (control voltage source). The detected composite augmenting signals are applied to the control grid of a phase splitter tube 356. This tube has a plate load resistor 336 and a cathode load resistor 338 across which it develops the oppositely phased signals. The signals developed across the plate load of tube 356 are applied to the control grid of the tube 340 and the signals developed across the cathode load of tube 356 are applied to the control grid of tube 342. Tubes 340 and 342 respectively operate as gated clipper amplifiers. These gated clipper amplifier tubes comprise pentodes whose plate current may be turned on or off by the application of signals to the suppressor grids. The mode control flip-flop 276 serves to apply signals to the suppressor grids of tubes 340 and 342 in a manner so that one or the other of these is turned on in accordance with the state of the mode control flip-flop 276. Accordingly, if the gated clipper amplifier tubes 340 and 342 are operated properly and synchronously with the transmitter then only true augmenting signals will appear across the common output load 346 of these two amplifiers. If these two amplifiers are rendered conductive improperly, then false sync will be passed to the following circuitry. True augmenting pulses will appear at the output of gated clipper amplifier 340 if it is enabled when the tube augmenting pulses are transmitted in Mode A. Similarly, true augmenting pulses will appear at the output of tube 342 if it is enabled when the augmenting pulses are transmitted in Mode B. These two outputs are combined across the matrix comprising the resistor 346, resulting in a train of negative going pulses which are applied to the control grid of the amplifier tube 348.

The ten loads which are driven by tube 348 include, at the plate circuit, nine in series corresponding to the eight tone filters 286A through 286H and the 7.875 kc. bandpass filter 284. The load across which the augmenting pulses are developed comprises the resistor 282 which is connected to the screen grid of the tube 348.

It was pointed out previously that some of the false augmenting pulses are transmitted at a frequency of 7.875 kc. (one-half of the horizontal synchronizing frequency), and these are selected by the filter 284, resulting in a sinusoidal output at a frequency of 7.875 kc. whenever these pulses appear. The 7.875 kc. output is rectified and integrated by rectifier and integrator 288, resulting in a negative DC voltage output which is used to cut off the negating signal amplifier 290, thereby de-energizing the negating relay coil 352. When the relay coil 352 is de-energized, negating switch 248A (FIGURE 20) opens, thereby cutting off the current to the oscillator control and damping diode 322. As explained previously, this results in the transmission of barker audio carrier to the output terminals 222. Therefore, whenever the mode control flip-flop is out of step with the corresponding flip-flop at the transmitter, the negating switch will cause the subscriber's television receiver to reproduce barker audio instead of program audio. The picture will also be spoiled because false augmenting pulses are applied to the augmenter input 304 (FIGURE 19). In an alternative arrangement, a second negating switch 248B may be used to short-circuit the screen load resistor 282 of amplifier 348 so that no augmenting pulses are applied to the augmenter. This too spoils the picture because the grey sync video signals will not be restored at all.

The filters 286A through 286H each select a different one of the eight tones which may be transmitted by the transmitter. The output of each one of these filters is connected to the identically numbered terminal of the respective selector switches 354A, 354B, 354C and 354D. The outputs of selector switches 354A and 354C are employed to drive the gate control flip flop 292. The outputs of selector switches 354B and 354D are applied as one input to the respective And gates 294 and 296. The other inputs comprise the outputs of gate control flip-flop 292.

A subscriber is informed over the barker audio channel or through other sources, as to the proper settings for the selector switches 354A through 354D in order that he may see the program which will be subsequently transmitted. He thereupon sets the selector switches to the proper locations. This causes the price demand and satisfaction apparatus 258, to be established at a setting representative of the price which must be paid to enable the subscriber receiver to receive this program. The subscriber then drops coinage into the price demand and satisfaction apparatus, whereby payment of the price demanded sets the paid switches 246 to their paid states.

The details of the price demand and satisfaction apparatus as shown in FIGURE 21 comprise a slide 258A, which carries a pointer 258B that travels over the scale 258C having various prices marked thereon. The slide is biased by a tension spring 258D so that it tends to the left, but it is restrained by the pawl 260E engaging in the ratchet teeth on the slide. The pawl 260E is biased by the tension spring 260F. The rotation of the selector switch 354A rotates the pinion gear 258E. The pinion engages with the gear teeth on slide 258F, which carries a stop 258G. At the same time the detents on the wheel 260A push on the corresponding projection 260H on the pawl actuator 260G (which is constrained so that it can only slide), thereby moving pawl 260E against the tension of spring 260F. This enables the spring 258D to pull the slide 258A to a position determined by the slide 258F, by virtue of the interception of the projection 258H by projection 258G.

To review briefly the result of moving the selector switch 354A, the slide 258A is released so that it may assume the position determined by the setting of the selector switch. The pointer, which is carried by the slide 258A, indicates the price chosen on the scale 258C. The subscriber also sets selectors 354B, 354C, and 354D. Each of the four selectors is connected to a different one of four printing wheels within the printing mechanism 262. This is a mechanism well known in the art so that no details of its operation are given here. The markings on the printing wheel which is connected to selector 354A correspond to the prices marked on scale 258C. The markings on each of the other three printing wheels are numbers which correspond to the positions of the respective selector switches 354B, 354C, and 354D.

In order to satisfy the price demand, the subscriber deposits coins in a coin sizer 258J. This is a well-known mechanism which detects the value of the coins deposited therein and rotates an output shaft a proportional amount. The output shaft rotates the pinion gear 258K, which engages the gear teeth on slide 258A. The slide is thereby moved in response to the deposited coinage towards the paid position. Upon attaining the paid position, the projection 258L on the slide 258A closes the paid switches 246A and 246B and opens paid switch 246C. The printer is actuated in response to the closure of switch 246B so that a record of the purchase is obtained in the form of numbers printed on a paper tape. The closure of paid switch 246A enables power to be supplied to the oscillator control and damping diode 242 (FIGURE 17) if the negating switch 248 (FIGURE 17) is also closed. This enables the program audio carrier to replace the barker audio carrier. As explained previously, the negating switch will be closed when the selector switches are set correctly because the mode control flip-flop 276 (FIGURE 18) will then be in step with the transmitter. The opening of paid switch 246C removes the short-circuit across the augmenting load resistor 282 (FIGURE 21) so that augmenting pulses may appear thereacross. The picture will also be correctly restored because true augmenting pulses are applied to amplifier 280 (FIGURE 18) if the mode control flip-flop is in step.

If the settings of the selector switches are improper so that they do not correspond to the settings of the selector switches at the transmitter, then the proper one of the gated clipped amplifiers will not always be enabled, whereby 7.875 kc. pulses will appear, and the negating relay 352 will be de-energized as explained previously. Thus, assuming that the subscriber sets the selector 354A to obtain a lower price and pays the lesser amount, he still will not receive the program properly, even though the paid switches are in the paid states. When the new program is transmitted, a new setting of selector switches (although not necessarily the price selector) will be required. When any of the selectors are disturbed the slide 258A is released to a position determined by the setting of selector 354A. The releasing action of any of the selectors is the same as that already described for selector 354A. As a result, the paid switches are returned to their unpaid states so that barker audio is heard and the picture is spoiled.

If a credit payment system is desired instead of a cash payment system, the apparatus in FIGURE 22 may be used. It comprises a solenoid 400, which may pull armature 402, which extends through the solenoid, against the tension of spring 412, thereby moving the paid switches 246A, 246B, and 246C to their paid states. When the subscriber wishes to buy a program he sets the selector switches 257 correctly and pushes the momentary contact switch 410, thereby energizing the solenoid. The energized solenoid pulls the armature 402 against the tension of spring 412, enabling pawl 404 to be pulled by the spring 414 into the notch 416 on the armature. Thus the armature remains latched by pawl 404 even after contacts 410 are opened. The sequence of events that follows operation of the paid switches 246A, 246B, and 246C is the same as in the cash payment system described previously. Program audio replaces barker audio and the picture is restored normally. At the same time the printer is actuated so that a printed record of the purchase is obtained. As in the cash payment system, the paid switches are released only when the selector switches are moved. The mechanism is identical to that described in the cash payment system comprising the detented wheels 260A, 260B, 260C, 260D, and the pawl actuator 260G. The subscriber may remove the printed tape from the printer at convenient intervals and remit the amount listed thereon. A duplicate record may be retained in the receiver to serve as a check on the accuracy of the remittance.

To briefly summarize the operation of this invention, at a transmitter grey sync video signals, comprising video signals with the composite synchronizing signals having their amplitude reduced into the grey level, are generated. There are also generated true augmenting pulses which are employed to restore the grey level sync signals to their proper level. These are timed to occur at the proper interval so that when employed at the receiver attachment they will produce the function intended.

The transmitter also produces two forms of false augmenting pulses, one of which has substantially the same frequency as the true augmenting pulses but is phase-shifted to occur at a time which is different from that of the true augmenting pulses. The other is at one-half of the frequency of the true augmenting pulses.

The true and false augmenting signals may be transmitted in one of two modes. In one mode the true augmenting signals are positive and the false augmenting signals are negative, and in the other mode the true augmenting signals are negative and the false augmenting signals are positive. The mode of transmittal is under the control of a mode switch which in turn is controlled by the control signals which are the tone signals.

A tone generator generates eight tones, any four of which are selected and presented in parallel to a tone sequence programmer. The tone selection establishes the price to be demanded for a program and a program identifying number. The function of the tone sequence programmer is to select these tones and to present them in a manner to cause the mode switch to operate randomly in response thereto. Thus, the tone sequence programmer selects one of four tones at random, every field. The output of the mode switch comprising true and false augmenting pulses, whose mode of transmission is switched in response to the randomly selected tones, is combined with these tones and transmitted as a composite augment signal along with barker audio signals, program audio signals, and grey sync video. It should be noted that mode switching occurs only during the vertical retrace interval.

At the receiver, an attachment is interposed between the receiving antenna and the antenna terminals of the subscribers receiver. The subscriber receives instructions for making switch settings which should correspond to the switch settings at the transmitter whereby the four out of eight tones are selected. The setting of these switches establishes a price for viewing the program and sets a recording means to a state corresponding to the setting of the switches. The setting of these switches also establishes a correct application of tones to decoding apparatus for properly separating true from false augmenting pulses, but they are not applied to the augmenter until payment is completed so the grey sync modulation is not restored. In addition, before payment, the barker audio carrier is selected. As a result, an unentertaining picture is displayed by the subscribers receiver and only barker audio is received.

Upon payment for the program, the receiver attachment substitutes the program audio for the barker audio. It also suppresses the barker audio whereby the receiver of the subscriber will only reproduce program audio.

In the event the selector switch settings are in error, even though the amount specified thereby is paid by the subscriber, the gating circuitry will not always turn on the proper one of the gated clipper amplifiers. As a result, some false augmenting pulses will appear at the output which spoil the reproduced picture. Some of these false pulses are sent at a frequency of 7.875 kc. These are detected and used to operate a relay which causes the attachment to apply barker audio to the receiver instead of program audio.

Should unauthorized television set owners attempt to use the augmenting pulses which are transmitted for reconstituting the grey sync video, then they will experience difficulty since not only is the polarity of the true and false augmenting pulses interchanged randomly, but also two types of false pulses are transmitted, one of which is at the same frequency as the true pulses.

There has accordingly been described herein a novel, useful and unique subscription television system.

We claim:

1. In a subscription television system of the type having a transmitter wherein there is generated grey sync video comprising composite video with composite sync signals reduced in amplitude to the grey level and means for generating true augmenting pulses for reconstituting said grey level composite sync signals in said grey sync video, the improvement comprising means for transmitting said true augmenting pulses in one of two different modes, means for generating in a random manner a plurality of control signals in a recurrent pattern, means for controlling the mode of transmission of said true augmenting pulses in response to predetermined ones of said recurrent pattern control signals, and means for transmitting said true augmenting pulses in the mode determined by said control signals together with said control signals.

2. In a subscription television system of the type having a transmitter wherein there is generated grey sync video comprising composite video with composite sync signals reduced in amplitude to the grey level, and means for generating true augmenting pulses for reconstituting said grey level composite sync signals in said grey sync video, the improvement comprising means for inverting the polarity of said true augmenting pulses, means for generating in a random manner a plurality of recurrent characteristic control signals, means responsive to predetermined ones of said recurrent characteristic control signals for transmitting true augmenting pulses together with said control signals, and means responsive to predetermined others of said recurrent characteristic control signals for transmitting inverted polarity true augmenting pulses together with said control signals.

3. In a subscription television system of the type having a transmitter wherein there is generated grey sync video comprising composite video with composite sync signals reduced in amplitude to the grey level, and means for generating true augmenting pulses for reconstituting said grey level composite sync signals in said grey sync video, the improvement comprising means for generating false augmenting pulses which cannot restore grey level composite sync to the proper composite sync, means for inverting the polarity of said true augmenting pulses, means for inverting the polarity of said false augmenting pulses, means for generating in a random manner a plurality of control signals in a recurrent pattern, means responsive to predetermined ones of said control signals for transmitting true augmenting pulses and inverted polarity false augmenting pulses together with said control signals, and means responsive to predetermined others of said recurrent pattern control signals for transmitting inverted polarity true augmenting pulses, and false augmenting pulses together with said control signals.

4. In a subscription television system as recited in claim 3 wherein said means for generating false augmenting pulses generates said pulses at the same frequency as said true augmenting pulses and at another frequency, the false augmenting pulses generated at the same frequency being phase displaced from the true augmenting pulses.

5. In a subscription television system of the type having a transmitter wherein there is generated grey sync video comprising composite video with the composite sync signals reduced in amplitude to the grey level, and means for generating true augmenting pulses for restoring grey level composite sync to the proper composite sync, the improvement comprising means for generating false augmenting pulses which cannot restore grey level composite sync to the proper composite sync, means for inverting the polarity of said true augmenting pulses, means for inverting the polarity of said false augmenting pulses, first means for combining said true augmenting pulses with said inverted polarity false augmenting pulses to provide first composite augmenting pulses, second means for combining said inverted polarity true augmenting pulses with said false augmenting pulses to provide second composite augmenting pulses, means for generating random control signals, first means for enabling the application of true augmenting pulses and inverted polarity false augmenting pulses to said first means for combining responsive to first predetermined random control signals, second means for enabling the application of inverted polarity true augmenting signals and false augmenting pulses to said second means for combining responsive to second predetermined random control signals, and means for transmitting the outputs of said first and second means for combining said random control signals.

6. In a subscription television system of the type wherein at a transmitter there is generated grey sync video comprising composite video with the composite sync signals reduced in amplitude to the grey level, and means for generating true augmenting pulses for properly reconstituting said grey level composite sync signals in said grey sync video signals, the improvement comprising means for generating false augmenting pulses which cannot properly reconstitute said grey level sync signals, means for inverting the polarity of said true augmenting pulses, means for inverting the polarity of said false augmenting pulses, first means for combining true augmenting pulses and inverted polarity false augmenting pulses, second means for combining inverted polarity true augmenting pulses with false augmenting pulses, a flip-flop circuit having a first stable state and a second stable state, means for generating a plurality of different control signals, means for transferring said flip-flop circuit between stable states responsive to said control signals, means responsive to said first stable state to apply true augmenting pulses and inverted polarity false augmenting pulses to said first means for combining, means for applying inverted polarity true augmenting pulses and false augmenting pulses to said second means for combining responsive to said flip-flop second stable state, a third means for combining the output of said first and second means for combining and the control signals applied to said flip-flop, and means for transmitting the output of said third means for combining.

7. In a subscription television system as recited in claim 6 wherein said means for generating a plurality of different control signals comprises means for generating a plurality of different tone signals, means for selecting a predetermined number of said different tone signals, a different And gate for each different tone signal selected, means for applying each said different tone signal to a different one of said And gates, means for randomly enabling each And gate in turn to pass the tone signals applied to its input, and means for applying the outputs of said And gates to said flip-flop circuit.

8. In a subscription television system as recited in claim 7 wherein said means for randomly enabling each And gate in turn to pass the tone signals applied to its input comprises a counter having as many different count states as there are And gates, means for randomly advancing the count of said counter except during vertical retrace intervals, and means for applying each separate count output of said counter to a different one of said And gates.

9. In a subscription television system of the type wherein at a transmitter there is generated grey sync video comprising composite video with composite synch signals reduced in amplitude to the grey level, and means for generating true augmenting pulses for properly reconstituting said grey level composite sync signals in said grey sync video signals, the improvement comprising means for generating false augmenting pulses which cannot properly reconstitute said grey level sync signals, means for inverting the polarity of said true augmenting pulses, means for inverting the polarity of said false augmenting pulses, an inoperative first means to which said true and false augmenting pulse generators are connected for providing the combination of true augmenting pulses with inverted polarity false augmenting pulses, and inoperative second means to which said true and false augmenting pulse generators are connected for providing the combination of inverted polarity true augmenting pulses with false augmenting pulses, means for rendering operative said first or said second means including a mode control flip-flop circuit having first and second stable states, means for applying output of said mode control flip-flop when in its first stable state to said inoperative first means to render it operative, means for applying output of said mode control flip-flop when in its second stable state to said inoperative second means to render it operative, control means for transferring said mode control flip-flop circuit between its two stable states including means for generating a plurality of different tones, means for selecting a predetermined number of said selected tones, a different And gate for each selected tone signal, means for applying each tone signal to each And gate, counter means, means for randomly advancing the count of said counter means, means for applying each different count output of said counter to a different one of said And gates to render it operative to pass tone signals, a gate control flip-flop circuit having a first and second stable state, means for applying a first and a second tone passed by two of said different And gates to drive said gate control flip-flop between its to stable states, a first and second And gate, means for applying a third and fourth tone passed by two others of said different And gates respectively to said first and second And gates, means for enabling said first and second And gates respectively responsive to the first and second stable state outputs of said gate control flip-flop, and means for applying the outputs of said first and second And gates to drive said mode control flip-flop between its two stable states; third means for combining the outputs of said first and second means for combining and the first, second, third and fourth tones, and means for transmitting the output of said third means for combining.

10. In a subscription television system of the type wherein a transmitter transmits coded video signals and also transmits decoding signals in one of two modes, which decoding signals are switched randomly between said two modes in response to predetermined control signals also having a random occurrence, a receiver for said signals, said receiver comprising means for receiving said coded video signals, said two modes of decoding signals and said control signals, means for converting said two modes of decoding signals to a single mode responsive to the application of a proper sequence of said control signals, subscriber operated means for applying said control signals to said means for converting said two modes to a single mode, and means to which said single mode decoding signals, and said coded video signals are applied for decoding said video signal.

11. In a subscription television system of the type wherein a transmitter transmits encoded television signals together with true decoding signals and false decoding signals, said true and false decoding signals being transmitted in one or the other of two modes and being switched randomly between said two modes in reponse to predetermined control signals which occur randomly in a repetitive sequence, a receiver for said signals, said receiver comprising means for receiving encoded video signals, said two modes of true and false decoding signals, and said control signals, means for converting said two modes of true and false decoding signals to an output consisting of only true decoding signals responsive to proper application of said predetermined control signals and for providing an output consisting of true and false decoding signals responsive to signals other than said predetermined control signals, subscriber operated means for applying said predetermined control signals to said means for converting, and means to which the output of said means for converting and said encoded video signals are applied for decoding said video signals in response to true decoding signals.

12. In a subscription television system of the type wherein a transmitter transmits encoded television signals together with true decoding signals and false decoding signals, said true and false decoding signals being transmitted in one or the other of two modes and being switched randomly between said two modes in response to predetermined control signals which occur randomly in a repetitive sequence, a receiver for said signals, said receiver comprising means for receiving encoded video signals, said two modes of true and false decoding signals, and said control signals, means for converting said two modes of true and false decoding signals to an output consisting of only true decoding signals responsive to proper application of said predetermined control signals and for providing an output consisting of true and false decoding signals responsive to signals other than said predetermined control signals, subscriber operated means for applying said predetermined control signals to said means for converting, and means to which the output of said means for converting and said encoded video signals are applied for decoding said video signals in response to true decoding signals, sensing means connected to the output of said means for converting and for detecting in said output the presence of false decoding signals when said subscriber operated means applies said signals other than predetermined control signals, and means responsive to said sensing means output for interfering with the entertainment value of said television program signals.

13. In a subscription television system as recited in claim 11 wherein said subscriber operated means includes means for establishing a coin demand, means for satisfying said coin demand, and means response to said subscriber operated means for recording the satisfaction of said coin demand.

14. In a subscription television system of the type wherein a transmitter transmits grey sync video signals comprising composite video signals with all of the synchronizing signals reduced to the grey level, and also transmits true augmenting pulse signals for reconstituting the grey level synchronizing signals into proper composite synchronizing signals, said true augmenting signals being transmitted in one of two modes and being switched randomly between said two modes in response to predetermined control signals which occur randomly in a repetitive sequence, a receiver for said signals, said receiver comprising means for receiving said grey sync video signals, said true augmenting signals and said control signals, means for converting said two modes of true augmenting signals to a single mode responsive to the application of a proper sequence of said predetermined control signals, subscriber operated means for applying said control signals to said means for converting said two modes to a single mode, and means to which said grey level video signals and said single mode true augmenting signals are applied for reconstituting said grey level sync signals to the proper level in said composite video signals.

15. In a subscription television system as recited in claim 14 wherein the control signals which are being transmitted also represent coin demand information and said subscriber operated means for applying said control signals to said means for converting said two modes to a single mode includes a means for establishing a coin demand responsive to the operation by said subscriber of said subscriber operated means, means for establishing the correct application of the predetermined control signals to said means for converting responsive to the operation by said subscriber of said subscriber operated means, means for satisfying said established coin demand, and means responsive to satisfaction of said coin demand for enabling said true augmenting signals to be applied to said means for reconstituting said grey level sync signals.

16. In a subscription television system of the type wherein a transmitter transmits grey sync video signals comprising composite video signals with all of the synchronizing signals reduced to the grey level, and also transmits true augmenting pulse signals for reconstituting the grey level synchronizing signals into proper composite synchronizing signals, said true augmenting signals being transmitted in one of two modes and being switched randomly between said two modes in response to predetermined control signals which occur randomly in a repetitive sequence, a receiver for said signals, said receiver comprising means for receiving said grey sync video signals, said true augmenting signals and said control signals, means for converting said two modes of true augmenting signals to a single mode responsive to the application of a proper sequence of said predetermined control signals, subscriber operated means for applying said control signals to said means for converting said two modes to a single mode, and payment demand establishing means operated responsive to said subscriber operated means for demanding a payment which must be satisfied, means for satisfying said payment, and means operative upon satisfaction of said demand means, and to which said grey level video signals and said single mode true augmenting signals are applied for reconstituting said grey level sync signals to the proper level in said composite video signals, and means for making a recording of the setting of said subscriber operated means responsive to operation of said payment demand satisfaction means.

17. In a subscription television system of the type wherein a transmitter transmits grey sync video signals comprising composite video signals with all of the synchronizing signals reduced to the grey level, and said transmitter also transmits true augmenting pulse signals for properly reconstituting the synchronizing signals and false augmenting pulse signals which cannot reconstitute said synchronizing signals, said true and false augmenting pulse signals being transmitted in a first mode with one relatively opposite pulse polarity and in a second mode with a reversed relatively opposite pulse polarity, and said transmitter also transmits predetermined control signals which occur randomly in a repetive sequence, said predetermined control signals determining the mode of transmission of said true and false augmenting signals, a receiver for all of said signals, said receiver comprising means for receiving said grey level video signals, said first and second mode signals and said predetermined control signals, mode selecting means to which said first and second mode signals are applied for providing an output comprising only true augmenting signals responsive to proper application of said predetermined control signals, subscriber operated means for applying said predetermined control signals to said mode selecting means, and means to which said grey sync video signals and the output of said mode selecting means are applied for reconstituting said grey level sync signals in response to true augmenting pulses to the proper level in said composite video signals.

18. In a subscription television system as recited in claim 17 wherein said control signals which are being transmitted also represent coin demand information, and said subscriber operated means for properly applying said predetermined control signals to said mode selecting means includes a means for establishing the correct application of said predetermined control signals to said mode selecting means responsive to the operation by said subscriber of said subscriber operated means, means for establishing a coin demand responsive to the operation by said subscriber of said subscriber operated means, means for paying said established coin demand, and means responsive to payment of said coin demand for enabling said mode selecting means to provide a true augmenting pulse signal output.

19. In a subscription television system as recited in claim 17 wherein said mode selecting means has a plurality of different predetermined control signal input terminals, and said subscriber operated means for applying said predetermined control signals to said mode selecting means comprises a plurality of switch means which are settable for selectively connecting a predetermined control signal to any of said plurality of different predetermined control signal input terminals.

20. In a subscription television system of the type wherein a transmitter transmits encoded video signals and also transmits decoding signals in one of two modes and is switched randomly between said two modes in response to predetermined control signals which occur randomly in a repetitive sequence, a receiver for said signals, said receiver comprising means for receiving said encoded video signals, said two modes of decoding signals, and said control signals, means for converting said two modes of decoding signals to a single mode responsive to the application of a proper sequence of said predetermined control signals, a subscriber operated switch means for selecting said predetermined control signals from said received signals, means for applying said selected predetermined signals, to said means for converting, said two modes of decoding signals into a single decoding signal mode, means to which said encoded video signal and said single mode decoding signals are applied for decoding said video signals, and means for recording the setting of said subscriber operated switch means.

21. In a subscription television system of the type wherein a transmitter transmits encoded video signals, and said transmitter also transmits true decoding signals and false decoding signals, said true and false decoding signals being transmitted in two opposite modes, and said transmitter also transmits predetermined control signals which occur randomly in a repetitive sequence, said predetermined control signals determining the mode of transmission of said true and false decoding signals, a receiver for all of said signals, said receiver comprising means for receiving all of said transmitted signals, mode selecting means to which said first and second mode signals are applied for providing an output comprising only true decoding signals responsive to proper application of said predetermined control signals, subscriber operated means for selecting said predetermined control signals from the control signals being received, means for applying said selected predetermined control signals to said mode selecting means, means to which said encoded video signals and the output of said mode selecting means are applied for decoding said encoded video signals, and means for making a recording of the selection established by said subscriber operated means.

22. In a subscription television system of the type wherein a transmitter transmits grey sync video signals comprising composite video signals with all of the synchronizing signals reduced to the grey level, and said transmitter also transmits true augmenting pulse signals for properly reconstituting the synchronizing signals and false augmenting pulse signals which cannot reconstitute said synchronizing signals, said true and false augmenting signals being transmitted in a first mode with one relatively opposite polarity and in a second mode with a reversed relatively opposite polarity, and said transmitter also transmits different control tones which occur randomly in a repetitive sequence, said predetermined control tones determining the mode of transmission of said true and false augmenting signals, a receiver for all said signals comprising means for receiving all said signals, mode selecting means to which said received first and second mode signals are applied for converting them to single polarity true augmenting pulses including a gate control flip-flop circuit having two stable states, means for driving said gate control circuit between its two stable states responsive to a first and second of said predetermined control tones, a mode control flip-flop having two stable states, means for driving said mode control flip-flop between its two stable states responsive to the two stable state outputs of said gate control flip-flop and a third and fourth of said predetermined control tones, means for separating said control tones from one another, subscriber operated means for selecting a first, second, third and fourth of said control tones from said separated control tones and applying them to said respective gate control and mode control flip-flop circuits, means responsive to the outputs of said mode control flip-flop to separate said true augmenting pulse signals from said false augmenting pulse signals, and means to which said grey sync video and the output of said mode selecting means are applied for reconstituting said grey level sync signals to the proper level.

23. In a subscription television system as recited in claim 20 wherein said predetermined control tones also represent coin demand information and said subscriber operated means for selecting includes means for establishing a coin demand responsive to the operation thereof by said subscriber, means for satisfying said coin demand, and means responsive to satisfaction of said coin demand for enabling an output from said mode selecting.

24. In a subscription television system of the type wherein a transmitter transmits coded video signals, program sound signals, true video decoding signals and false video decoding signals transmitted in different modes and predetermined control signals used for instructing the transmitter in the desired mode of transmission, a receiver for receiving all said signals, means to which said true and false video decoding signals are applied for providing an output comprising only true decoding signals when said predetermined control signals are properly applied and true and false decoding signals when said predetermined signals are improperly applied, subscriber operated means for properly applying said control signals to said means, means to which said coded video and the output of said means are applied for decoding said video when said means output consists of only true video decoding signals, means to which the output of said means is applied for detecting the presence of false decoding signals in said output and providing an indication signal thereof, and inhibiting means connected to the output of said means for detecting the presence of false decoding signals and to which program sound signals are applied for inhibiting program sound signal output in the presence of an indication signal.

25. In a subscription television system as recited in claim 24 wherein said false video decoding signals are transmitted at two different frequencies, one of which is the frequency of said true video decoding signals but phase displaced therefrom and the other is a different frequency, and said means to which the output of said mode selecting means is applied for detecting the presence of false decoding signals detects false decoding signals at said different frequency.

26. In a subscription television system of the type wherein a transmitter transmits coded video signals, program sound signals, barker sound signals, true video decoding signals and false video decoding signals transmitted in different modes, and predetermined control signals used for instructing the transmitter in the desired mode of transmission, a receiver for receiving all said signals, mode selecting means to which said true and false video decoding signals are applied for providing an output comprising only true decoding signals when said predetermined control signals are properly applied and false decoding signals when said predetermined control signals are improperly applied, subscriber operated means for properly applying said control signals to said mode selecting means, means to which said coded video and the output of said mode selecting means are applied for decoding said video when said mode selecting means output consists of only true video decoding signals, means to which the output of said mode selecting means is applied for detecting the presence of false decoding signals in said output and providing an indication signal thereof and audio selecting means connected to the output of said means for detecting the presence of false decoding signals and to which program and barker audio sound signals are applied for producing barker sound signal output in the presence of said indicating signal and program sound signal output in the absence of said indicating signal.

27. In a subscription television system of the type wherein a transmitter transmits grey sync video signals comprising composite video signals with all of the synchronizing signals reduced to the grey level and said transmitter also transmits true augmenting pulse signals for properly reconstituting the synchronizing signals and false augmenting pulse signals which cannot reconstitute said synchronizing signals, said true and false augmenting pulse signals being transmitted in a first mode with one relatively opposite pulse polarity and in a second mode with a reversed relatively opposite pulse polarity, said transmitter also transmitting predetermined control signals which occur randomly in a repetitive sequence, said predetermined control signals determining the mode of transmission of said true and false augmenting signals, and said transmitter transmitting program audio signals; a television receiver attachment comprising means for receiving all said signals, mode selecting means to which said first and second mode signals are applied for providing an output comprising only true augmenting signals in response to proper application of said predetermined control signals and true and false augmenting signals in response to improper application of said predetermined control signals, subscriber operated means for properly applying said predetermined control signals to said mode selecting means, reconstituting means to which said grey sync video signals and the output of said mode selecting means are applied for reconstituting in response to true augmenting pulse signals said grey level sync signals to the proper level, false augmenting pulse detecting means to which the output of said mode selecting means is applied for detecting the presence of false augmenting pulses, and sound inhibiting means to which the output of said false augmenting pulse detecting means and said program audio signals are applied to provide a program audio signal output only in the presence of no output from said false augmenting pulse detecting means.

28. In a subscription television system of the type wherein a transmitter transmits grey sync video signals comprising composite video signals with all of the synchronizing signals reduced to the grey level, said transmitter also transmits true augmenting pulse signals for properly reconstituting the synchronizing signals and false augmenting pulse signals which cannot reconstitute said synchronizing signals, said false augmenting pulse signals being transmitted with two different predetermined frequencies, said true and false augmenting pulse signals being transmitted in a first mode with one relatively opposite pulse polarity and in a second mode with a reversed relatively opposite pulse polarity, said transmitter also transmitting predetermined control signals which occur randomly and in a repetitive sequence, said predetermined control signals determining the mode of transmission of said true and false augmenting signals, said transmitter transmitting program audio signals on a first carrier and barker audio signals on a second carrier, a television receiver attachment comprising means for receiving all said signals, mode selecting means to which said first and second mode signals are applied for providing an output comprising only true augmenting signals in response to proper application of said predetermined control signals and true and false augmenting signals in response to improper application of said predetermined control signals, subscriber operated means for properly applying said predetermined control signals to said mode selecting means, reconstituting means to which said grey sync video signals and the output of said mode selecting means are applied for reconstituting in response to true augmenting pulses said grey level sync signals to the proper level, false augmenting pulse detecting means to which the output of said mode selecting means is applied for detecting the presence of false augmenting pulses at one of said two different frequencies, and sound selecting means to which the output of said detecting means and to which both program audio and barker audio carriers are applied to provide a barker audio output in the presence of an output from said false augmenting pulse detecting means and a program audio output in the presence of no output from said false augmenting pulse detecting means.

29. In a subscription television system as recited in claim 28, wherein said control signals which are being transmitted also represent coin demand information, and said subscriber operated means for properly applying said predetermined control signals to said mode selecting means includes means for establishilng a coin demand responsive to the operation by said subscriber of said subscriber operated means, means for paying said established coin demand, means responsive to the payment of said coin demand for enabling said mode selecting means to provide a true augmenting pulse signal output, and means responsive to the payment of said coin demand to enable said selecting means to function to provide a program audio output in the presence of no output from said detecting means.

30. In a subscription television system as recited in claim 28, wherein said mode selecting means has a plurality of different predetermined control signal input terminals, and said subscriber operated means for applying said predetermined control signals to said mode selecting means comprises a plurality of switch means which are settable for selectively connecting a predetermined control signal to any of said plurality of different predetermined control signal input terminals.

31. A subscription television system comprising a transmitter and a receiver, said transmitter having means for generating grey sync video which includes composite video with composite sync signals reduced in amplitude to the grey level, means for generating true augmenting pulses for reconstituting said grey level composite sync signals in said grey sync video, means for transmitting said true augmenting pulses in one of two different modes, means for generating control signals randomly in a repetitive sequence, means for controlling the mode of transmission of said true augmenting pulses in response to predetermined one of said control signals, means for transmitting said control signals; said receiver having means for receiving all of said transmitted signals, means for converting said two modes of true augmenting signals to a single mode responsive to the application of a proper sequence of said predetermined control signals, subscriber operated means for properly applying said control signals to said means for converting said two modes to a single mode, and means to which said grey level video signals and said single mode true augmenting signals are applied for reconstituting said grey level sync signals to the proper level in said composite video signals.

32. A subscription television system comprising a transmitter and a receiver, said transmitter having means for generating grey sync video including composite video with composite sync signals reduced in amplitude to the grey level, means for generating true augmenting pulses for reconstituting said grey level composite sync signals in said grey sync video, means for generating false augmenting pulses which cannot restore grey level composite sync to the proper level, means for inverting the polarity of said true augmenting pulses, means for inverting the polarity of said false augmenting pulses, means for generating in a random manner a plurality of control signals in a recurrent pattern, means responsive to predetermined ones of said control signals for transmitting true augmenting pulses and inverted polarity false augmenting pulses as one mode of transmission, means responsive to predetermined others of said recurrent characteristic control signals for transmitting inverted polarity true augmenting pulses and false augmenting pulses as a second mode of transmission, means for transmitting said grey sync video signals and said control signals; said receiver comprising means for receiving all said transmitted signals, mode selecting means to which said two mode transmission signals are applied for providing an output comprising only true augmenting signals responsive to proper application of said predetermined control signals, subscriber operated means for applying said predetermined control signals to said mode selecting means, and means to which said grey sync video signals and the output of said mode selecting means are applied for reconstituting said grey level sync signals in response to true augmenting pulses to the proper level in said composite video signals.

33. A subscription television system as recited in claim 25, wherein said control signals which are being transmitted also represent coin demand information, said decoding means has a plurality of different predetermined control signals input terminals, said subscriber operated means for applying said predetermined control signals to said mode selecting means comprises a plurality of switch means which are settable for selectively connecting the predetermined control signal to any of said plurality of different predetermined control signal input terminals, means for establishing a coin demand responsive to the setting of said plurality of switches, means for paying said established coin demand, and means responsive to payment of said coin demand for enabling said decoding means to provide a true augmenting pulse signal output.

34. A subscription television system comprising a transmitter and a receiver, said transmitter having means for generating grey sync video including composite video with composite sync signals reduced in amplitude to the grey level, means for generating true augmenting pulses for restoring grey level composite sync to the proper level, means for generating false augmenting pulses which cannot restore said grey sync to the proper level, means for inverting the polarity of said true augmenting pulses, means for inverting the polarity of said false augmenting pulses, first means for combining said true augmenting pulses with said inverted polarity false augmenting pulses to provide first composite augmenting pulses, second means for combining said inverted polarity true augmenting pulses with said false augmenting pulses to provide second composite augmenting pulses, means for generating control signals randomly in a repetitive pattern, first means for enabling the application of true augmenting pulses and inverted polarity false augmenting pulses to said first means for combining responsive to first predetermined random control signals, second means for enabling the application of inverted polarity true augmenting pulses and false augmenting pulses to said second means for combining responsive to second predetermined random control signals, means for transmitting the outputs of said first and second means for combining said control signals, means for generating program audio signals, and means for transmitting said grey sync video and said program audio signals; said receiver comprisng mode selecting means to which said first and second composite augmenting pulse signals are applied for providing an output comprising only true augmenting pulse signals responsive to proper application of said predetermined control signals and true and false augmenting pulse signals responsive to improper application of said predetermined control signals, subscriber operated means for applying said predetermined control signals to said mode selecting means, means to which said grey sync video signals and the output of said means are applied for reconstituting said grey level sync signals in response to true augmenting pulses to the proper level in said composite video signals, means to which the output of said mode selecting means is applied for detecting the presence of false augmenting signals in said output and providing an indication signal thereof, and mode selecting means for providing a program audio signal output only in the absence of an indicating signal, said mode selecting means beng connected to the output of said means of detecting the presence of false augmenting signals and having program audio signals applied thereto.

35. A subscription television system as recited in claim 34 wherein said control signals which are being transmitted also represent coin demand information, said mode selecting means has a plurality of different predetermined control signal input terminals, said subscriber operated means for applying said predetermined control signals to said mode selecting means comprises a plurality of switch means which are settable for selectively connecting the predetermined control signals to any of said plurality of different predetermined control signal input terminals, means for establishing a coin demand responsive to the setting of said plurality of switches, means for paying said established coin demand, and means responsive to payment of said coin demand for enabling said mode selecting means to provide a true augmenting pulse signal output.

36. A subscription television system comprising a transmitter and a receiver said transmitter having means for generating grey sync video signals including composite video signals with all of the synchronizing signals reduced to the grey level, said transmitter including means for generating true augmenting pulse signals for properly reconstituting the synchronizing signals and false augmenting pulse signals which cannot reconstitute said synchronizing signals, said false augmenting pulse signals being generated with two different predetermined frequencies, means for generating predetermined control signals which occur randomly in a repetitive sequence, means for transmitting said true and false augmenting pulse signals in a first or a second mode responsive to predetermined ones of said control signals, said first mode of transmission being one wherein said true augmenting pulses are transmitted with one polarity and said false augmenting pulses are transmitted with an opposite polarity, said second mode of transmission being one wherein said true augmenting pulses and false augmenting pulses are transmitted with a polarity reversed to the one in which they are transmitted in said first mode, means for generating program audio signals, and means for generating barker audio signals, and means for transmitting said grey sync video signals, said control signals, said barker audio signals, and said program audio signals; said receiver comprising means for receiving all said signals, mode selecting means to which said first and second mode signals are applied for providing an output comprising only true augmenting signals in response to proper application of said predetermined control signals and true and false augmenting signals in response to improper application of said predetermined control signals, subscriber operated means for properly applying said predetermined control signals to said mode selecting means, reconstituting means to which said grey sync video signals and the output of said decoding means are applied for reconstituting in response to true augmenting pulses said grey level sync signals to the proper level, false augmenting pulse detecting means to which the output of said mode selecting means is applied for detecting the presence of false augmenting pulses at one of said two different frequencies, and sound selecting means to which the output of said detecting means and to which both program audio and barker audio signals are applied to provide a barker audio output in the presence of an output from said false augmenting pulse detecting means and program audio output in the presence of no output from said false augmenting pulse detecting means.

37. A subscription television system comprising a transmitter and a receiver, said transmitter including means for generating coded video signals, means for generating program sound signals, means for generating barker sound signals, means for generating true video decoding signals, means for generating false video decoding signals, means for generating predetermined control signals randomly in a repetitive pattern, means at said transmitter responsive to said control signals for transmitting said true and false video decoding signals in different modes, means for transmitting said coded video signals, said program sound signals, said barker sound signals, and said control signals; said receiver comprising means for receiving all of said transmitted signals, mode selecting means to which said true and false video decoding signals are applied for providing an output comprising only true decoding signals when said predetermined control signals are properly applied and true and false decoding signals when said predetermined control signals are improperly applied, subscriber operated means for properly applying said control signals to said decoding means, means to which said coded video and the output of said mode selecting means are applied for decoding said video when said mode selecting means output consists of only true video decoding signals, means to which the output of said decoding means is applied for detecting the presence of false decoding signals in said output and providing an indication thereof, and detecting means connected to the output of said means for detecting the presence of false decoding signals and to which program and barker audio sound signals are applied for producing barker sound signal output in the presence of said indicating signal and program sound signal output in the absence of said indicating signal.

References Cited

UNITED STATES PATENTS

| | | | |
|---|---|---|---|
| 2,957,939 | 10/1960 | Morris | 178—5.1 |
| 3,081,376 | 3/1963 | Loughlin | 178—5.1 |
| 3,184,537 | 5/1965 | Court | 178—5.1 |

ROBERT L. GRIFFIN, Primary Examiner

HOWARD W. BRITTON, Assistant Examiner